US009390753B2

(12) United States Patent
Ishihara et al.

(10) Patent No.: US 9,390,753 B2
(45) Date of Patent: Jul. 12, 2016

(54) CONTENT MANAGEMENT APPARATUS, RECORDING APPARATUS, OPERATION APPARATUS, CONTENT MANAGEMENT SYSTEM, AND CONTROL METHODS THEREOF

(71) Applicant: CANON KABUSHIKI KAISHA, Tokyo (JP)

(72) Inventors: Akihito Ishihara, Yokohama (JP); Hiroyuki Hasegawa, Nagareyama (JP); Toshio Minoshima, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 14/185,235

(22) Filed: Feb. 20, 2014

(65) Prior Publication Data

US 2014/0169756 A1 Jun. 19, 2014

Related U.S. Application Data

(62) Division of application No. 13/656,169, filed on Oct. 19, 2012, now Pat. No. 8,774,591.

(30) Foreign Application Priority Data

| Oct. 28, 2011 | (JP) | ................................. 2011-237963 |
| Oct. 28, 2011 | (JP) | ................................. 2011-237964 |
| Oct. 28, 2011 | (JP) | ................................. 2011-237965 |

(51) Int. Cl.
*H04N 5/76* (2006.01)
*G11B 27/031* (2006.01)
(Continued)

(52) U.S. Cl.
CPC .......... *G11B 27/031* (2013.01); *G11B 27/3027* (2013.01); *H04N 5/76* (2013.01); *H04N 5/765* (2013.01); *H04N 5/772* (2013.01); *H04N 9/8205* (2013.01)

(58) Field of Classification Search
None
See application file for complete search history.

(56) References Cited

U.S. PATENT DOCUMENTS

| 2001/0038032 A1* | 11/2001 | Kang ..................... G06F 3/062 235/375 |
| 2004/0015740 A1* | 1/2004 | Dautelle ............... G06F 9/4443 714/37 |

(Continued)

FOREIGN PATENT DOCUMENTS

| JP | 2010-278860 A | 12/2010 |
| JP | 2011-172128 A | 9/2011 |

OTHER PUBLICATIONS

The above foreign patent document was cited in the Jun. 26, 2015 Japanese Office Action, with an English Translation, that issued in Japanese Patent Application No. 2011-237964.

(Continued)

*Primary Examiner* — Hung Dang
*Assistant Examiner* — Sunghyoun Park
(74) *Attorney, Agent, or Firm* — Cowan, Liebowitz & Latman, P.C.

(57) ABSTRACT

A content management apparatus, which includes a recording unit for recording a content, and an operation unit for accepting a user operation required to append additional information to the content, executes at least one of a first process for recording additional information in association with a latest content of already recorded contents and a second process for recording additional information in association with a content to be recorded, and a third process for recording additional information in association with a currently recording content in response to respective execution instructions. Enabling and disabling user operations required to issue execution instructions of the first to the third processes are switched based on whether or not a content recording operation of the recording unit is in progress.

7 Claims, 25 Drawing Sheets

(51) Int. Cl.
*H04N 5/765* (2006.01)
*G11B 27/30* (2006.01)
*H04N 5/77* (2006.01)
*H04N 9/82* (2006.01)

(56) References Cited

U.S. PATENT DOCUMENTS

2005/0073391 A1* 4/2005 Mizobuchi ............ H04N 1/4406
340/5.74
2006/0114514 A1* 6/2006 Rothschild ........ G06F 17/30265
358/3.28
2007/0116425 A1* 5/2007 Hatanaka ................. G06F 21/10
386/252
2007/0199038 A1* 8/2007 Choi ...................... H04N 5/782
725/134
2009/0245758 A1* 10/2009 Kodama ................ H04N 5/765
386/291

OTHER PUBLICATIONS

The above foreign patent document was cited in the Jun. 12, 2015 Japanese Office Action, with an English Translation, that issued in Japanese Patent Application No. 2011-237963.

* cited by examiner

F I G. 6A
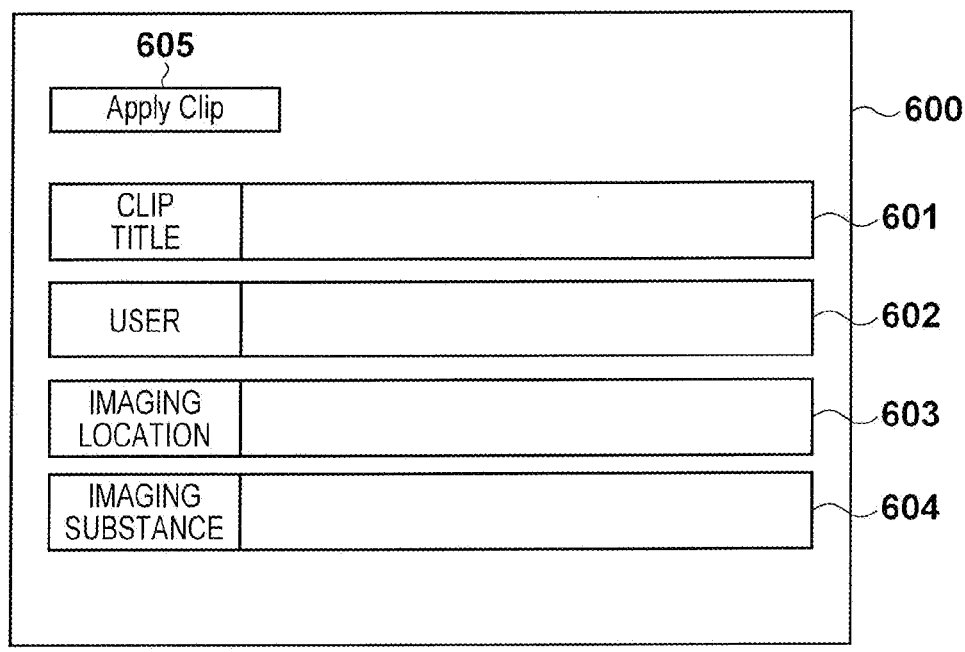
F I G. 6B
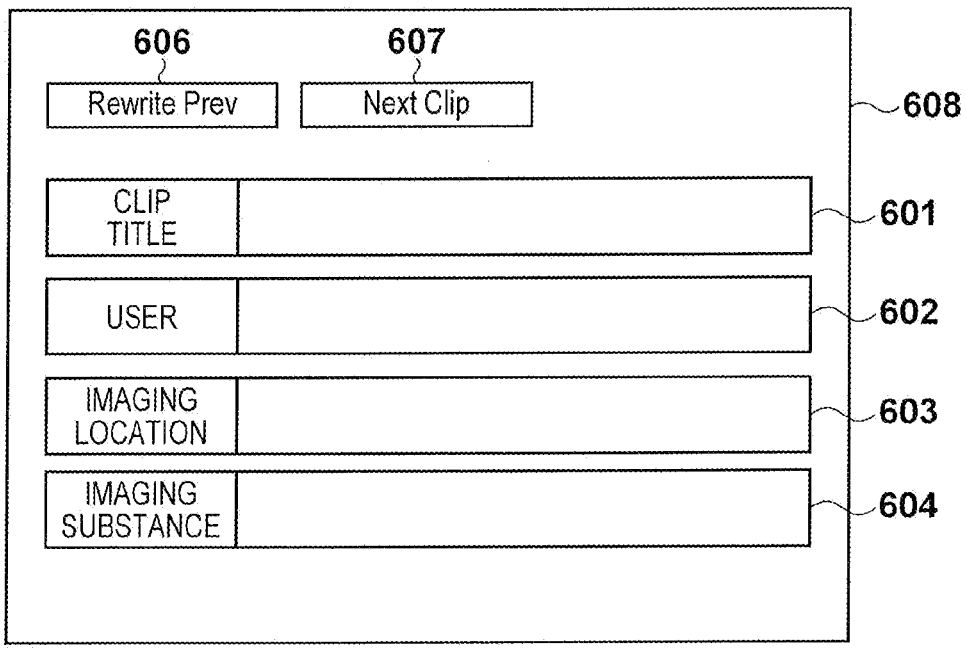

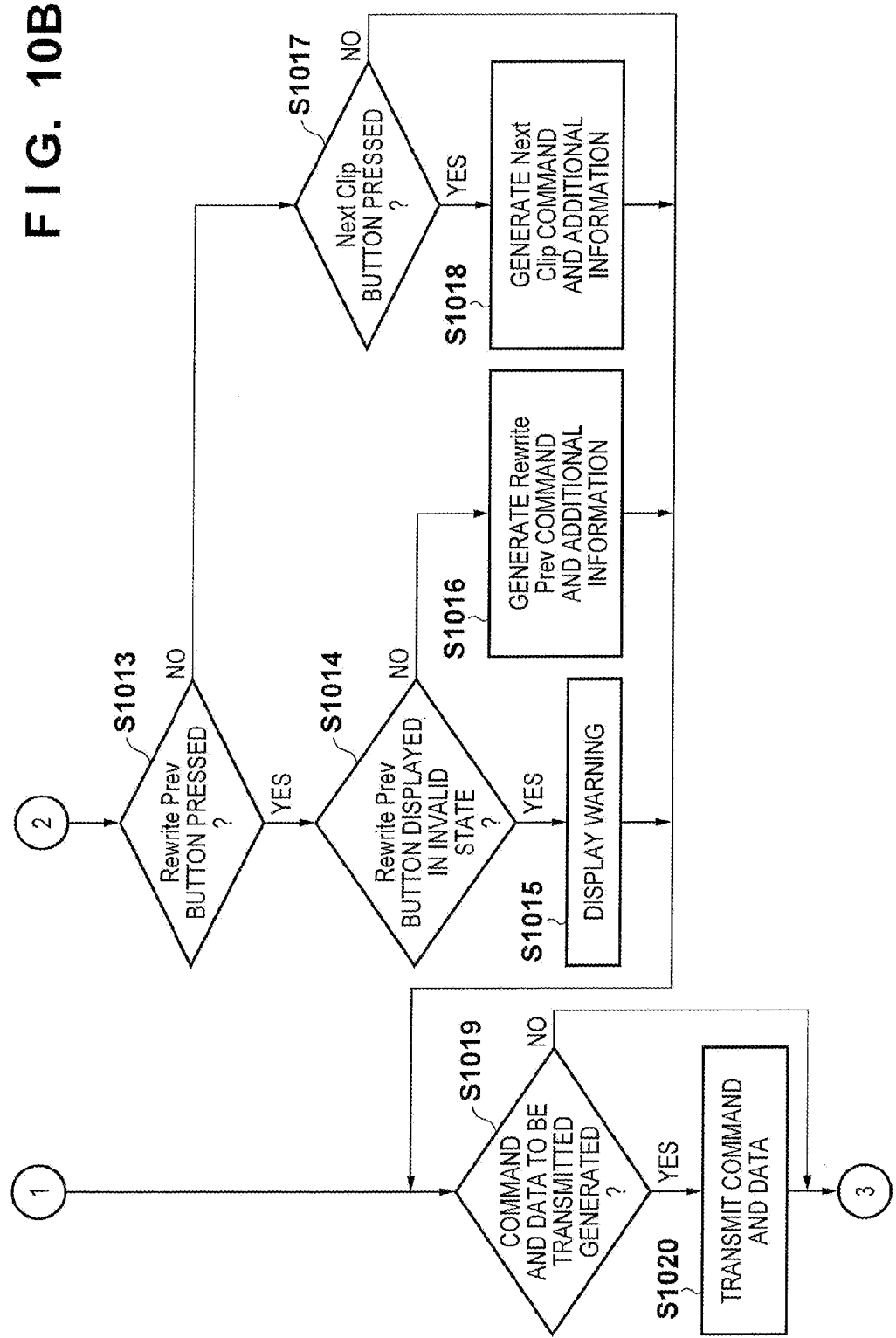

F I G. 16
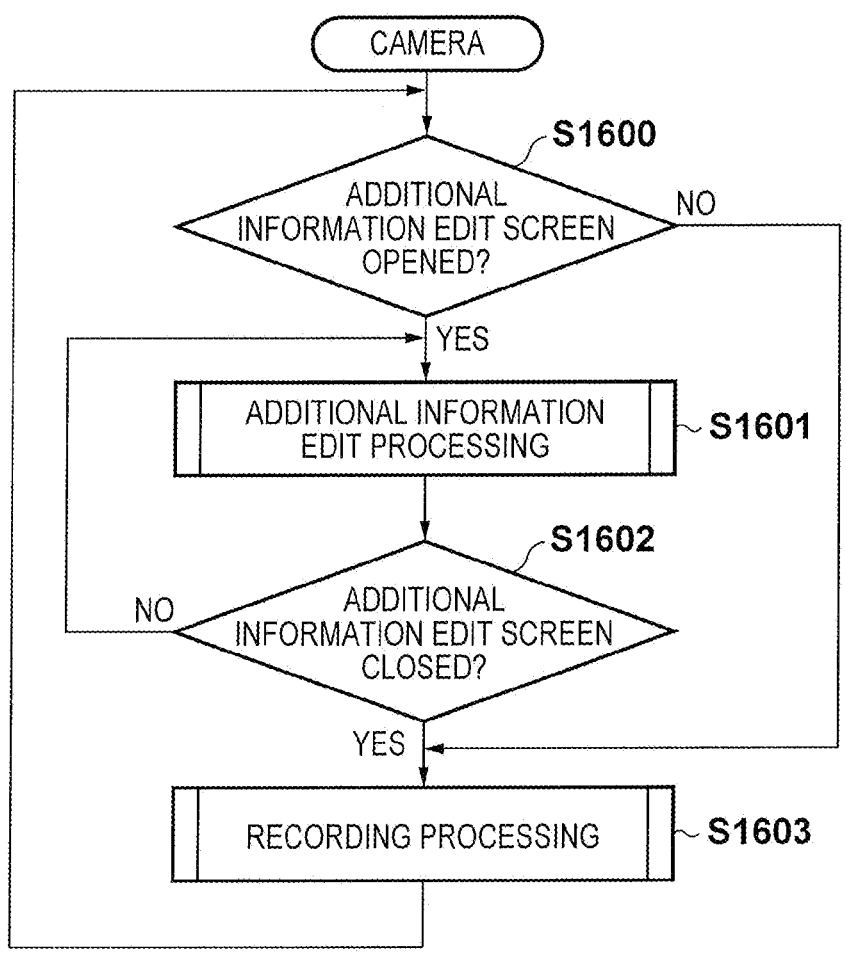

F I G. 17A
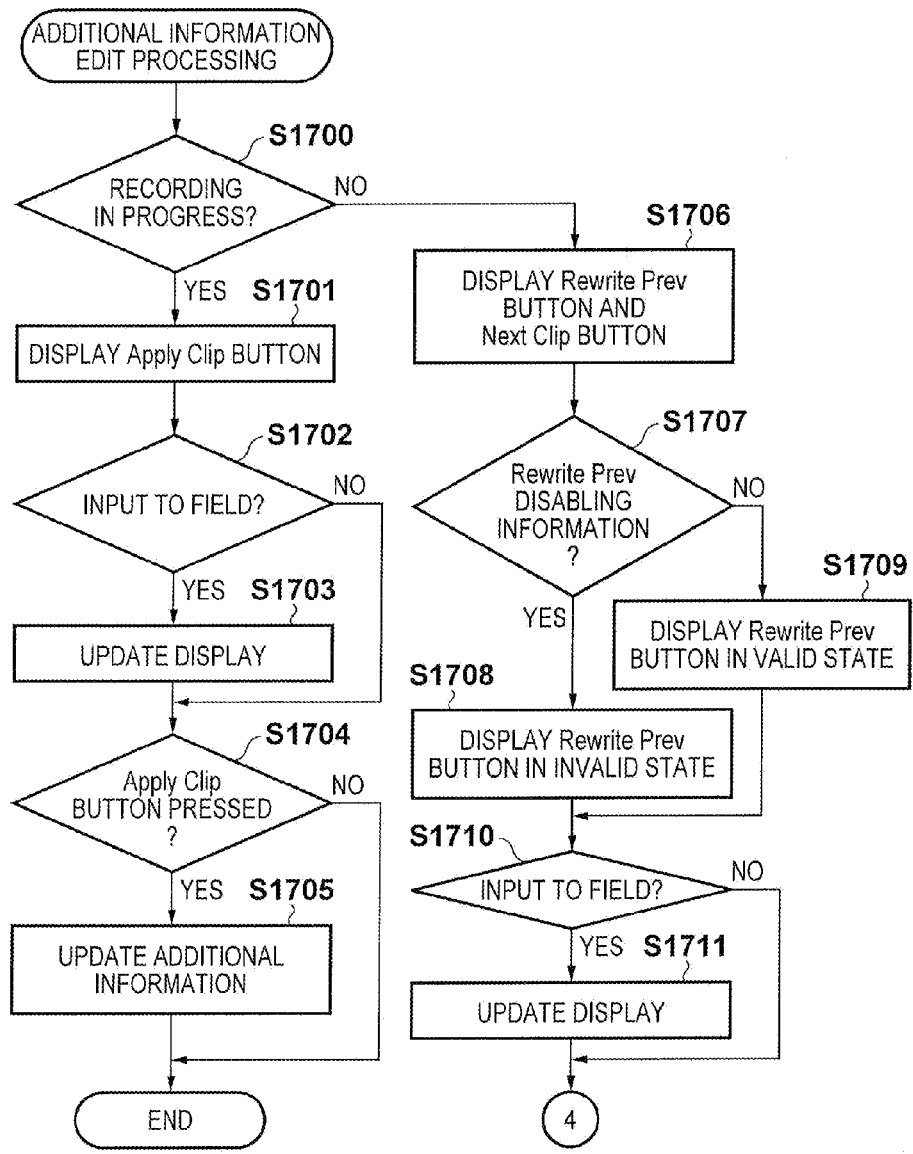

CONTENT MANAGEMENT APPARATUS, RECORDING APPARATUS, OPERATION APPARATUS, CONTENT MANAGEMENT SYSTEM, AND CONTROL METHODS THEREOF

CROSS-REFERENCE TO RELATED APPLICATIONS

This application is a divisional of application Ser. No. 13/656,169, filed Oct. 19, 2012 the entire disclosure of which is hereby incorporated by reference.

BACKGROUND OF THE INVENTION

1. Field of the Invention

The present invention relates to a content management apparatus, recording apparatus, operation apparatus, content management system, and their control methods, which record additional information in association with a content recorded in a recording medium.

2. Description of the Related Art

In recent years, electronic imaging apparatuses such as digital still cameras and digital video cameras, which record contents such as captured images in compact, lightweight memory cards, have held market superiority. Such electronic imaging apparatuses have advanced functions, and can record not only captured images but also various kinds of additional information associated with captured images. For example, user information, imaging location information, and text information, such as a comment, can be recorded together with a captured image. Additional information associated with a captured image is used as, for example, information required to search for a target image upon execution of edit processing.

Patent literature 1 discloses the following technique. That is, a person icon and genre icon are displayed together with a captured image after that image is captured, and when the user touches one of these icons, information such as personal information and a keyword associated with that icon is appended to the image as identification information.

Patent literature 2 discloses the following technique. That is, an imaging apparatus includes a wireless function, and additional information edited by a terminal device such as a portable tablet PC or smartphone is transferred to the imaging apparatus via wireless communications, thereby executing change processing of additional information.

[Patent Literature 1] Japanese Patent Laid-Open No. 11-146317

[Patent Literature 2] Japanese Patent Laid-Open No. 2003-188950

When the user inputs additional information to be appended to an image, a target image with which the input additional is associated mainly includes three types of images, that is, an image to be captured, a currently capturing image, and an image recorded by the immediately preceding recording operation. For this reason, the apparatus prompts the user to select an image to which the input additional information is to be appended from the above three choices, thereby appending the additional information to an image of the user's choice. However, when these three choices are displayed on a terminal device during capturing of a moving image, the user hardly recognizes whether the "image to be captured" is an image recorded by continuing the current recording operation or an image to be recorded after the current recording operation is temporarily stopped and a new recording operation is started. Also, the user hardly recognizes whether the "image recorded by the immediately preceding recording operation" is an image recorded before the current recording operation is started or a recorded part of a currently recording moving image clip. In this manner, when additional information is appended to an image using the terminal device during imaging (during recording), and allows the user to select an image to which that information is to be appended, the user hardly recognizes an image to which the information is appended, resulting an erroneous operation.

SUMMARY OF THE INVENTION

The present invention has been made in consideration of the aforementioned problems, and provides a content management apparatus which allows additional information to be correctly associated with a content intended by the user in an operation for recording additional information at the time of recording of the content.

According to one aspect of the present invention, there is provided a content management apparatus including a recording unit configured to record a content, and an operation unit configured to accept a user operation required to append additional information to the content, the apparatus comprising: a processing unit configured to execute at least one of a first process for recording additional information in association with a latest content of already recorded contents and a second process for recording additional information in association with a content to be recorded, and a third process for recording additional information in association with a currently recording content in response to user operations corresponding to the respective processes; and a control unit configured to disable user operations required to issue execution instructions of the first and second processes and to enable a user operation required to issue an execution instruction of the third process in the operation unit when a content recording operation of the recording unit is in progress, and to enable the user operation required to issue the execution instruction of at least one of the first and second processes and to disable the user operation required to issue the execution instruction of the third process in the operation unit when the content recording operation of the recording unit is not in progress.

Further features of the present invention will become apparent from the following description of exemplary embodiments with reference to the attached drawings.

BRIEF DESCRIPTION OF THE DRAWINGS

FIGS. 6A and 6B are views showing display examples of screens in the external device control mode of the portable terminal 200;

FIGS. 10A and 10B are flowcharts showing the overall processing in the external device control mode of the portable terminal 200 according to the fourth embodiment;

FIG. 16 is a flowchart showing the overall processing in a camera mode of the digital video camera 100 according to the seventh embodiment;

FIGS. 17A and 17B are flowcharts showing the additional information processing of the digital video camera 100 according to the seventh embodiment;

DESCRIPTION OF THE EMBODIMENTS

First Embodiment

Figure 1:
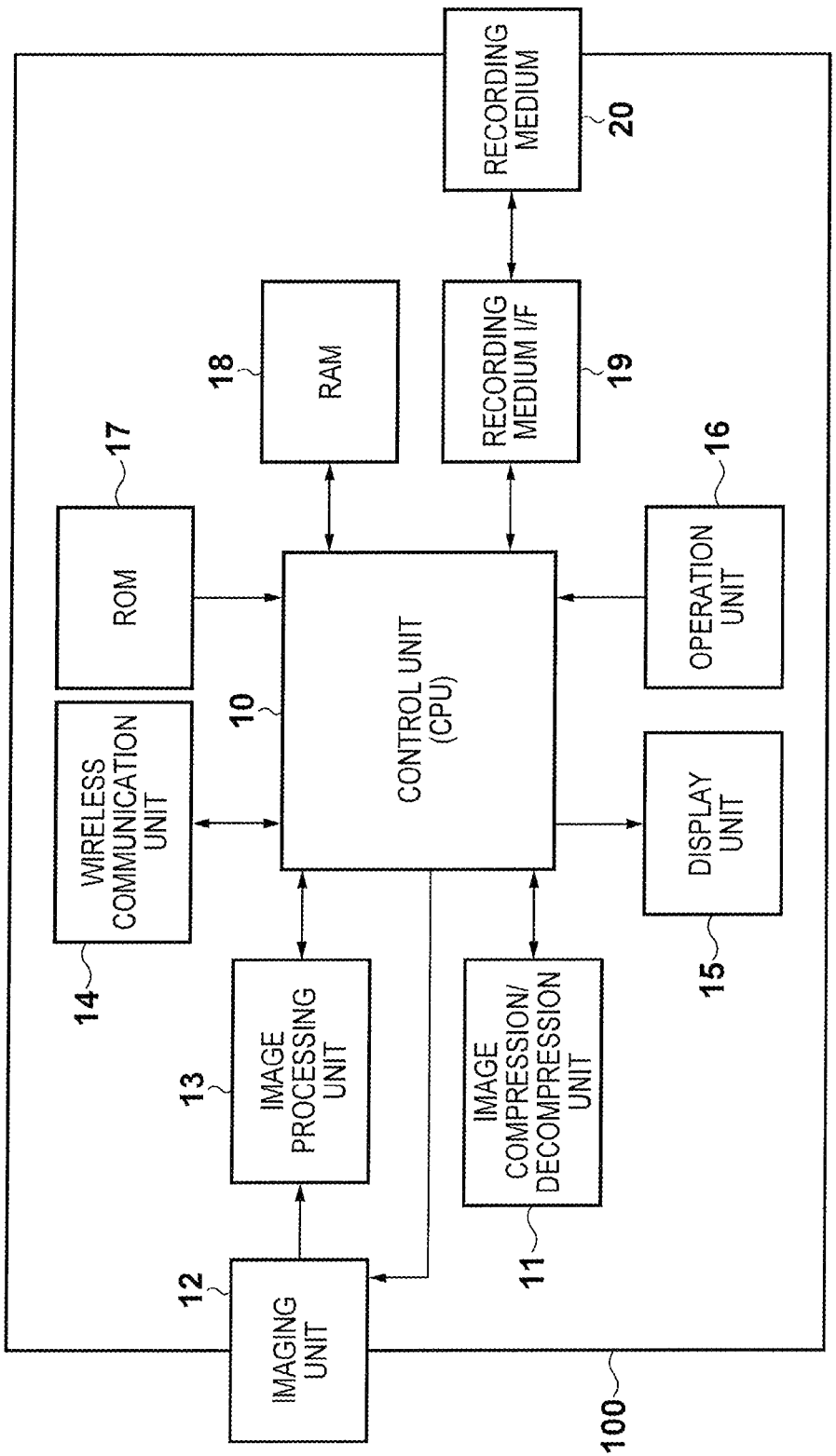
FIG. 1 is a hardware block diagram of a digital video camera 100 according to the first embodiment.
Figure 2:
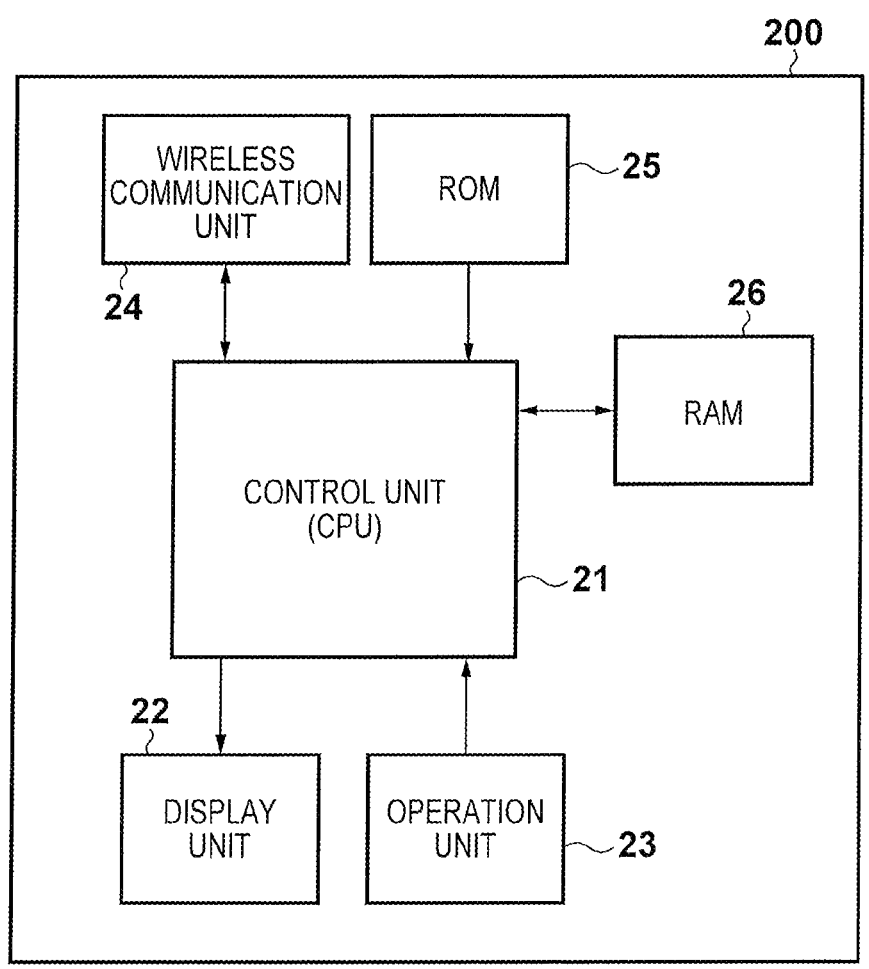
FIG. 2 is a hardware block diagram of a portable terminal 200 according to the first embodiment.

The following embodiments will exemplify a moving image management apparatus as a content management system or content management apparatus which includes a recording apparatus for recording a content including image or audio data, and an operation apparatus for accepting a user operation required to append additional information to the content recorded by the recording apparatus. Also, a digital video camera which can record a moving image will be exemplified as the recording apparatus, and a portable terminal which can communicate with the digital video camera via a wireless or wired communication will be exemplified as the operation apparatus. However, the present invention is not limited to these apparatuses. The recording apparatus and operation apparatus need not be independent apparatuses, and the operation apparatus may be built in the recording apparatus. FIGS. 1 and 2 show an example of an image management apparatus to which the present invention is applicable. The image management apparatus can be configured using a digital video camera 100 (camcorder) shown in FIG. 1 and a portable terminal 200 shown in FIG. 2.

The arrangement of the digital video camera 100 according to the first embodiment will be described first with reference to FIG. 1. Referring to FIG. 1, respective units such as an image compression/decompression unit 11, imaging unit 12, image processing unit 13, wireless communication unit 14, display unit 15, operation unit 16, ROM 17, RAM 18, and recording medium I/F 19 are connected to a control unit 10. The control unit 10 and the respective units can exchange data with each other.

The control unit 10 functions as a system control unit which controls the overall system of the digital video camera 100. The control unit 10 controls the respective units and executes the flowcharts (to be described later) by expanding programs recorded in the ROM 17 onto the RAM 18 and executing the expanded programs. The ROM 17 is a nonvolatile recording medium, and stores programs to be executed by the control unit 10. The RAM 18 is a volatile recording medium used as a work memory of the control unit 10. Also, the RAM 18 is used as a memory which temporarily stores image data which are captured by the imaging unit 12 and undergo image processing by the image processing unit 13 or image data read out from a detachable recording medium 20 so as to provide them to the image compression/decompression unit 11. Furthermore, the RAM 18 is used as a VRAM which temporarily stores these image data so as to display them on the display unit 15. Moreover, the RAM 18 is used as a memory which provides a holding area that temporarily stores additional information to be recorded in association with a captured image. The additional information can be received from the portable terminal 200 via the wireless communication unit 14.

The digital video camera 100 includes the recording medium I/F 19 which can detachably attach the recording medium 20 required to record image data. The recording medium I/F 19 is a slot into which the recording medium 20, such as a memory card, can be detachably inserted. FIG. 1 shows an example in which the detachable recording medium 20 is attached to the recording medium I/F 19. In the above description, the digital video camera 100 adopts the arrangement in which image data is recorded in the detachable recording medium 20. Alternatively, an arrangement in which image data is recorded in a memory which is not detachable and is incorporated in the digital video camera 100 may also be used.

The image processing unit 13 applies predetermined pixel interpolation, resize processing, and color conversion processing to image data captured by the imaging unit 12. The image processing unit 13 executes predetermined calculation processing using the captured image data, and the control unit 10 executes various kinds of control (exposure control, auto white balance control, and so forth) associated with imaging operations by the imaging unit 12 based on the obtained calculation result. The image compression/decompression unit 11 executes processing for compressing image data which has undergone image processing of the image processing unit 13 and decompression processing for image data read out from the detachable recording medium 20.

The imaging unit 12 has an imaging lens (including a zoom lens and focus lens), and image sensor, captures an image of an object under the control of the control unit 10, and acquires image data such as a still image or moving image. The display unit 15 is a display required to display various setting states, an image captured by the imaging unit 12, an image which is read out from the detachable recording medium and is played back, and the like under the control of the control unit 10. The display unit 15 is configured as a display inside a viewfinder, vari-angle liquid crystal monitor, and the like.

The operation unit 16 includes a power switch required to supply a power supply voltage to the digital video camera 100, a recording start button, a mode switching button which allows the user to switch an operation mode to a camera mode (imaging mode) or play mode, and the like, and which accepts user operations. Note that when the operation unit 16 includes a touch panel, the control unit 10 can detect the following user operations on the touch panel:
- an operation in which the user touches the touch panel with the finger or a pen (to be referred to as "touch-down" hereinafter);
- a state in which the user keeps touching the touch panel with the finger or pen (to be referred to as "touch-on" hereinafter);
- an operation in which the user moves the finger or pen which is kept touching the touch panel (to be referred to as "move" hereinafter);
- an operation in which the user releases the finger or pen touching the touch panel (to be referred to as "touch-up" hereinafter); and
- a state in which nothing touches the touch panel (to be referred to as "touch-off" hereinafter).

The control unit 10 is notified of these user operations and position coordinates where the finger or pen touches the touch panel, and determines an operation on the touch panel based on the notified information. As for "move", the control unit 10 can also determine a moving direction of the finger or pen moved on the touch panel based on changes of position coordinates for respective vertical and horizontal components on the touch panel. When the user makes a "touch-up" operation via a given "move" operation after a "touch-down" operation, he or she can draw a stroke. An operation for quickly drawing a stroke is called "flick". A "flick" operation is that in which the user quickly moves the finger kept touching the touch panel a certain distance, and then releases the finger. In other words, the "flick" operation is that in which the user quickly goes over the touch panel as if he or she were flipping the surface of the touch panel. When a "move" operation by a predetermined distance or more at a predetermined speed or more is detected, and the "touch-up" operation is then detected, it can be determined that the "flick" operation is made. When a "move" operation by a predetermined distance or more at a speed less than the predetermined speed is detected, it is determined that a "drag" operation is made. The touch panel may use any of various systems such as a resistive film system, electrostatic capacitance system, surface acoustic wave system, infrared system, electromagnetic induction system, image recognition system, and optical sensor system.

The wireless communication unit 14 exchanges data with external apparatuses such as the portable terminal 200 and a personal computer via wireless communications under the control of the control unit 10. The control unit 10 transmits setting information, operation information, and the like of the digital video camera 100 to the external apparatus and receives operation commands of the digital video camera 100, additional information to be recorded together with image data, and the like from the external apparatus via the wireless communication unit 14. Data which can be exchanged may include digital image data and an analog video signal. The connection between the digital video camera 100 and portable terminal 200 is not limited to the wireless communication, but a wired communication may be used.

The arrangement of the portable terminal 200 of this embodiment will be described below. Referring to FIG. 2, respective units such as a display unit 22, operation unit 23, wireless communication unit 24, ROM 25, and RAM 26 are connected to a control unit 21, and the control unit 21 and respective units can exchange data with each other.

The control unit 21 is a system control unit which controls the overall system of the portable terminal 200. The control unit 21 controls the respective units and executes processes shown in the flowcharts (to be described later) by expanding programs recorded in the ROM 25 onto the RAM 26 and executing the expanded programs. The ROM 25 is a nonvolatile recording medium, and stores programs to be executed by the control unit 21. The RAM 26 is a volatile recording medium used as a work memory of the control unit 21. The display unit 22 is a display required to display various setting states, data (including digital image data and an analog video signal) received by the wireless communication unit 24, and the like under the control of the control unit 21.

The operation unit 23 includes various switches used to accept user operations such as a power switch required to supply a power supply voltage to the portable terminal 200. Note that the operation unit 23 includes a touch panel in the same manner as the operation unit 16. User operations acceptable by the touch panel included in the operation unit 23 and the systems are the same as those of the touch panel included in the aforementioned operation unit 16.

The wireless communication unit 24 exchanges data with external apparatuses such as the digital video camera 100 (external camera) and a personal computer via wireless communications under the control of the control unit 21. The control unit 21 receives setting information, operation information, and the like of the digital video camera 100 and transmits operation commands of the digital video camera 100, additional information to be recorded together with image data, and the like via the wireless communication unit 24. Also, data which can be exchanged may include digital image data and an analog video signal. Also, the communication between the portable terminal 200 and digital video camera 100 may use a wired communication.

Figure 3:
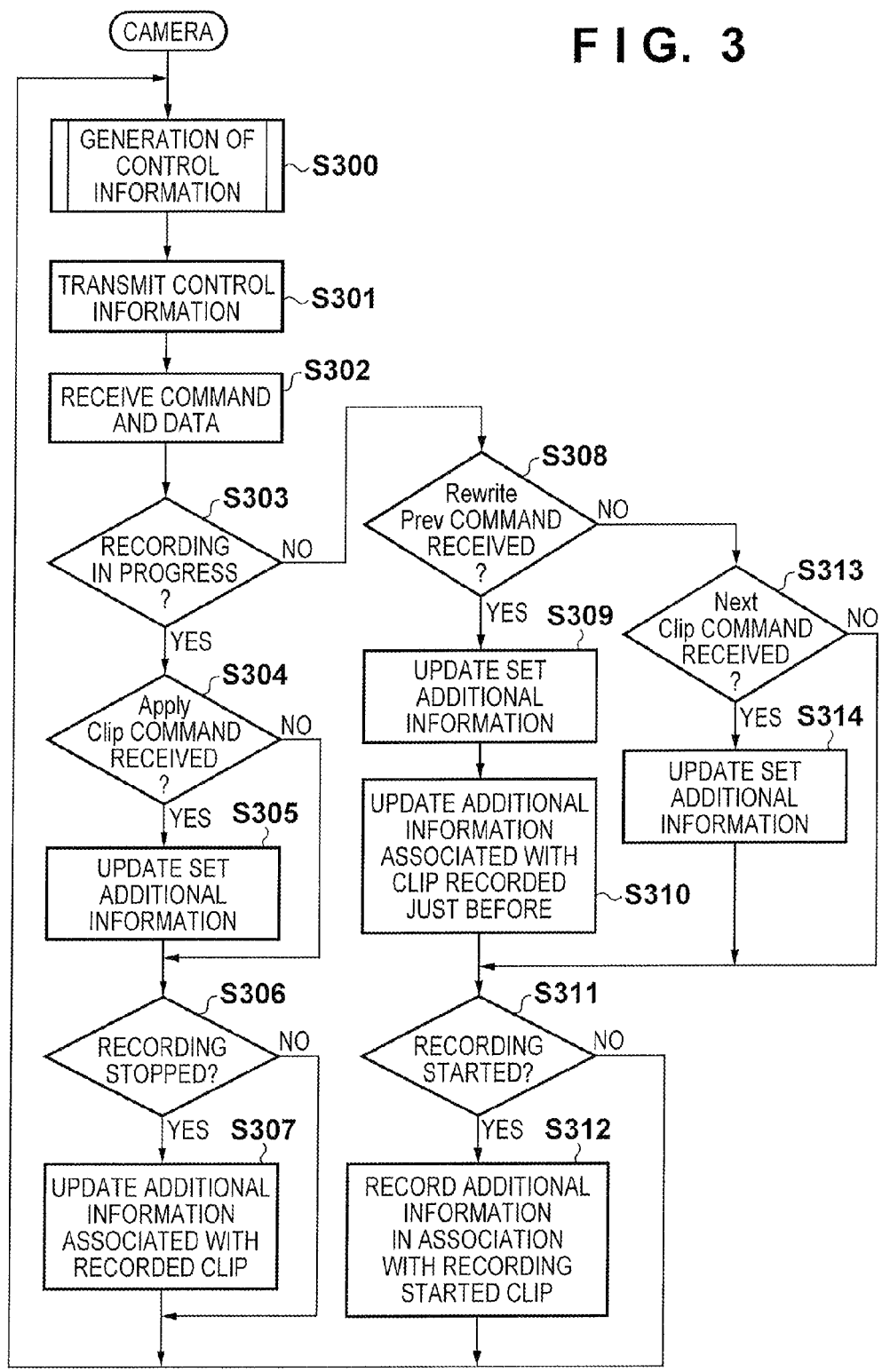
FIG. 3 is a flowchart showing the overall processing in a camera mode by the digital video camera 100 according to the first embodiment.
Figure 4:
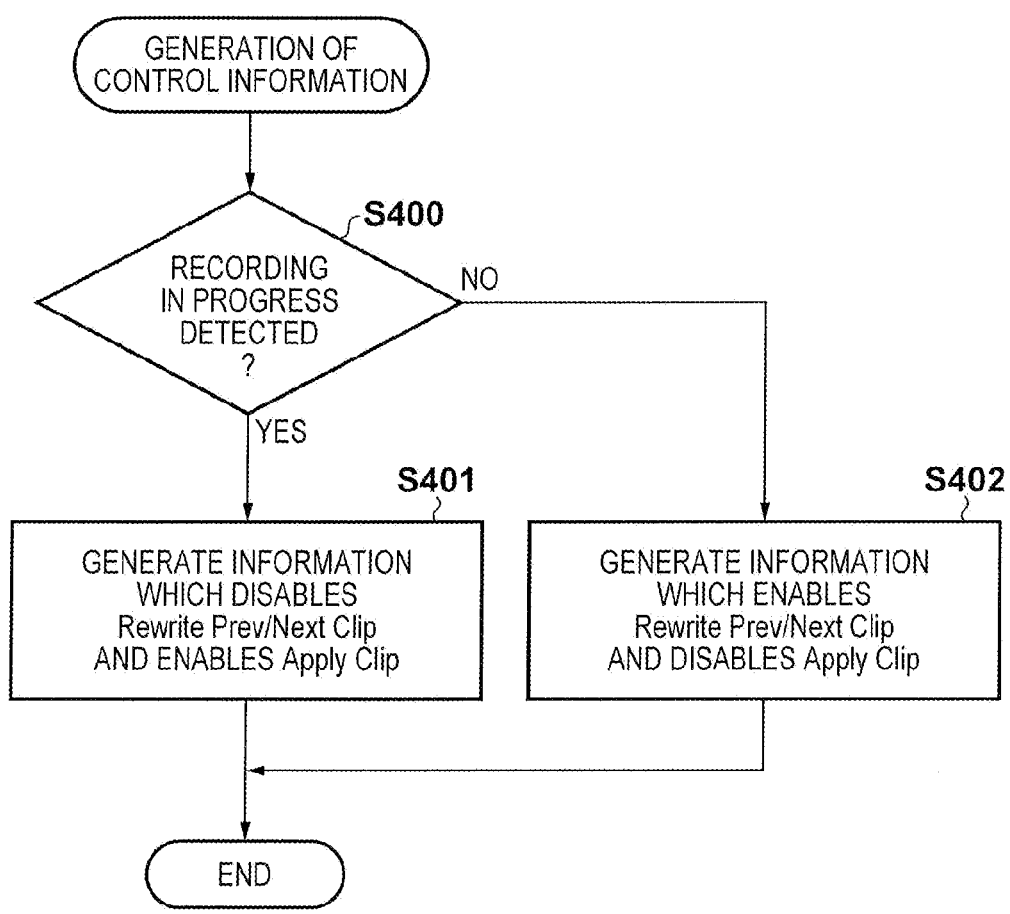
FIG. 4 is a flowchart showing the control information generation processing of the digital video camera 100.
Figure 5:
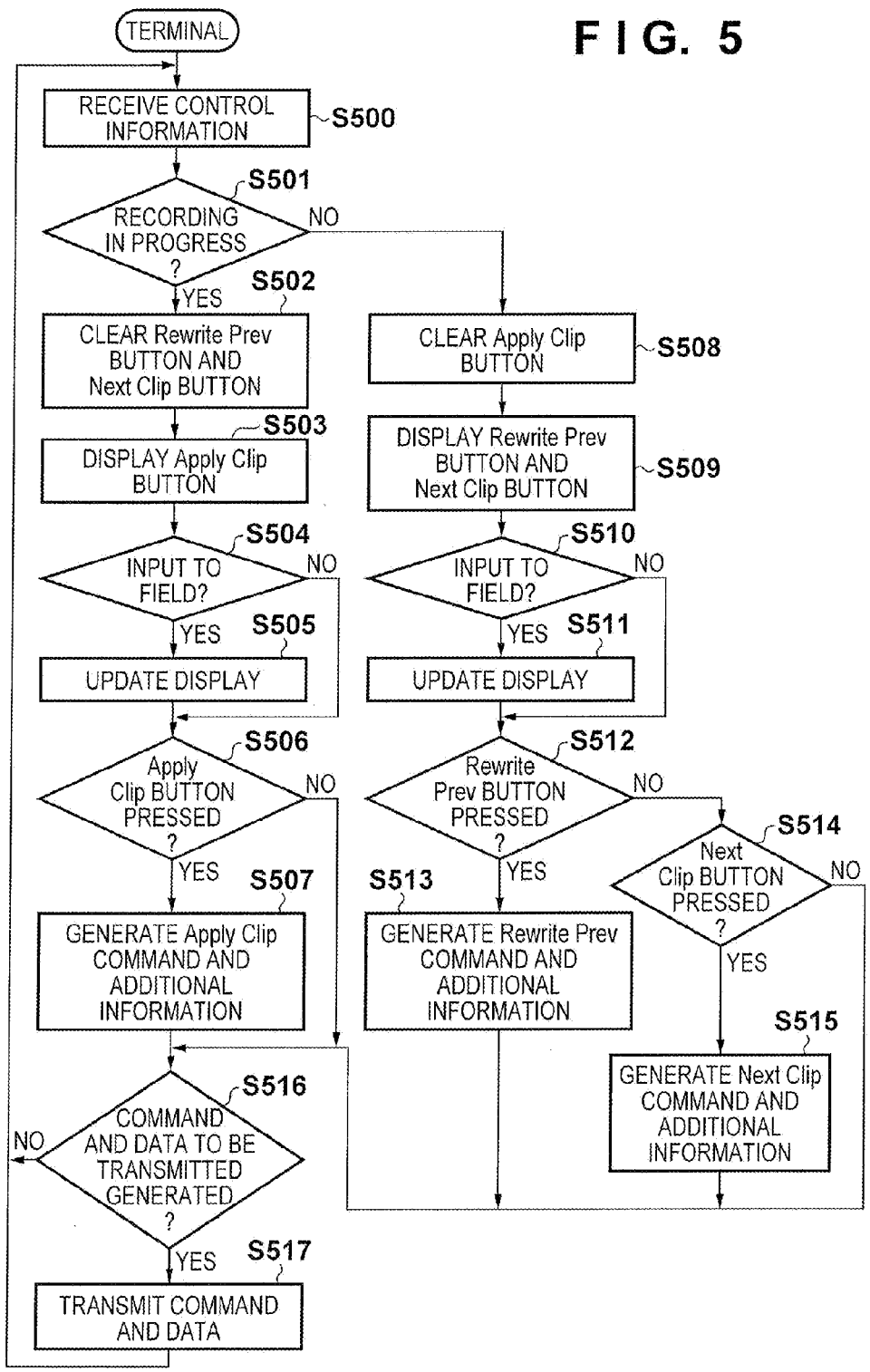
FIG. 5 is a flowchart showing the overall processing in an external device control mode of the portable terminal 200.

Flowcharts shown in FIGS. 3 to 5 show the operations of the digital video camera 100 and portable terminal 200 according to the first embodiment. Respective processes in the flowcharts shown in FIGS. 3 and 4 are implemented when the control unit 10 included in the digital video camera 100 expands programs stored in the ROM 17 onto the RAM 18 and executes the expanded programs. When the digital video camera 100 is set in a camera mode (imaging mode) by a user operation for the operation unit 16, the processing shown in FIG. 3 is started. In this embodiment, as operations for setting additional information in the camera mode, the following three processes will be exemplified:
- a first process: additional information associated with a clip recorded by the immediately preceding recording operation is rewritten by additional information received from the portable terminal 200;
- a second process: additional information received from the portable terminal 200 is applied as additional information to be associated with a clip to be recorded; and
- a third process: additional information received from the portable terminal 200 is applied as additional information to be associated with a currently recording moving image.

FIG. 3 is a flowchart showing the overall processing sequence in the camera mode. After the camera mode is set, the control unit 10 generates control information to be transmitted to the portable terminal 200 based on the setting state of the digital video camera 100 in step S300. Details of this processing will be described later with reference to FIG. 4. In step S301, the control unit 10 transmits the control information generated in step S300 to the portable terminal 200 via the wireless communication unit 14. In step S302, the control unit 10 receives data of operation commands of the digital video camera 100 and additional information from the portable terminal 200 via the wireless communication unit 14. The control unit 10 checks in step S303 whether a moving image recording operation is in progress, or a recording standby state other than the recording operation is set. The recording operation in progress is determined when a recording stop instruction is not issued after a recording start instruction is issued. If it is determined that the recording operation is in progress, the process advances to step S304; if it is determined that the recording operation is not in progress (the recording standby state is determined), the process advances to step S308.

The control unit 10 checks in step S304 whether or not a command which instructs to execute the third process for applying the additional information received in step S302 as that to be associated with the currently recording moving image (to be referred to as an Apply Clip command hereinafter) is received. If it is determined that the Apply Clip command is received, the process advances to step S305; otherwise, the process jumps to step S306. In step S305, the control unit 10 updates additional information which is held in a holding area of the RAM 18 as that to be recorded in association with an image by the additional information received in step S302 (in this stage, processing for associating the additional information with an image itself is not executed). The control unit 10 checks in step S306 whether or not the recording operation is stopped. It is determined that the recording operation is stopped, for example:

when the user instructs to stop the recording operation of moving image data by a video recording stop button included in the operation unit 16; or when a recording stop command is received in step S302 to instruct to stop the recording operation of moving image data.

If it is determined that the recording operation is stopped, the process advances to step S307; otherwise, the process returns to step S300 to repeat the above processes. In step S307, the control unit 10 updates additional information associated with a clip recorded so far. Note that one clip corresponds to one moving image file. Alternatively, a partial range of a moving image indicating a range which is recorded after a recording start instruction is accepted until a recording stop instruction is accepted of a single moving image file may be used as one clip.

As will be described later in step S312, since additional information is temporarily associated with a moving image at a recording start timing of that moving image, a clip recorded so far already includes the associated additional information at a recording stop timing. In step S307, processing for rewriting the existing additional information by the latest substance is executed.

The clip recorded so far and the additional information associated with that clip are recorded in the detachable recording medium 20. For example, the clip recorded so far and the additional information associated with that clip are associated with each other when they are stored as a moving image file having stream data of a moving image and as an additional information file in a single folder to have one-to-one correspondence. In step S307, the substance of the additional information file associated with the clip recorded so far recorded in the recording medium 20 is updated by the substance of the additional information held in the RAM 18. Thus, if additional information is received together with the Apply Clip command before a recording stop instruction is issued, the additional information associated with the image is updated by the additional information received together with the Apply Clip command when the recording operation is stopped. If no additional information is received together with the Apply Clip command before a recording stop instruction is issued, the substance of the additional information associated with the image is the same as that appended when the recording operation is started.

On the other hand, the control unit 10 checks in step S308 whether or not a command which instructs to execute the first process for rewriting additional information associated with a clip recorded by the immediately preceding recording operation (to be referred to as a Rewrite Prev command hereinafter) is received in step S302. If it is determined that the Rewrite Prev command is received, the process advances to step S309; otherwise, the process advances to step S313. In step S309, the control unit 10 updates the additional information held in the holding area of the RAM 18 as that to be recorded in association with an image by the additional information received in step S302 in the same manner as in step S305. In step S310, the control unit 10 updates the additional information recorded in the recording medium 20 in association with the clip recorded by the immediately preceding recording operation. The clip recorded by the immediately preceding recording operation and additional information associated with that clip are recorded in a single folder to have one-to-one correspondence in the recording medium 20, as described above. Therefore, the control unit 10 updates the additional information associated with the clip recorded by the immediately preceding recording operation recorded in the recording medium 20 by the additional information held in the RAM 18. Then, the substance of the additional information recorded in the detachable recording medium 20 in association with the clip recorded by the immediately preceding recording operation is updated by that of the additional information received together with the Rewrite Prev command.

On the other hand, the control unit 10 checks in step S313 whether or not a command which instructs to execute the second process for applying additional information to be recorded in association with a clip to be recorded (to be referred to as a Next Clip command hereinafter) is received. If it is determined that the Next Clip command is received, the process advances to step S314; otherwise, the process jumps to step S311. In step S314, the control unit 10 updates the additional information held in the RAM 18 as that to be recorded in association with an image by the additional information received in step S302 in the same manner as in step S305.

The control unit 10 checks in step S311 whether or not the recording operation is started. It is determined that the recording operation is started, for example:

when the user instructs to start the recording operation of moving image data using a recording start button included in the operation unit 16; or when a recording start command is received in step S302 to instruct to start the recording operation of moving image.

If it is determined that the recording operation is started, the process advances to step S312; otherwise, the process returns to step S300 to repeat the above processes.

In step S312, the control unit 10 records additional information held in the RAM 18 (that designated by the Next Clip command) in the recording medium 20 in association with a new clip whose recording operation is started. Thus, if additional information is received together with the Next Clip command after the previous recording stop instruction until the current recording start instruction, the additional information received together with the Next Clip command is recorded in the detachable recording medium 20 in association with an image whose recording operation is currently started.

Note that even the additional information received together with the Rewrite Prev command is recorded in association with an image whose recording operation is currently started since the additional information held in the holding area of the RAM 18 is updated in step S309. To avoid this, the processing of step S309 is excluded from the processing shown in FIG. 3, and the recording medium 20 is updated by the additional information, which is received together with the Rewrite Prev command in step S302, in step S310 so as not to update the additional information held in the RAM 18. In this way, the only the additional information of an image recorded by the immediately preceding recording operation, which information is received together with the Rewrite Prev command, can be updated. If neither the Next Clip command nor the Rewrite Prev command is received between the previous recording stop instruction and the current recording start instruction, the additional information held in the holding area of the RAM 18 before that is associated with an image recorded by the immediately preceding recording operation. That is, the additional information having the same substance as that associated with the previously recorded image is associated with the image recorded by the immediately preceding recording operation.

FIG. 4 is a flowchart showing details of the control information generation processing in step S300 in FIG. 3. The control unit 10 checks in step S400 whether or not the recording operation of the digital video camera is in progress. Note that the recording operation of the digital video camera 100 in progress is determined, as described above in the processes of steps S303 and S306. If it is determined in step S400 that the recording operation is in progress, the process advances to step S401; otherwise, the process advances to step S402.

In step S401, in accordance with the detection result in step S400 indicating that the recording operation is in progress, the control unit 10 generates information which disables Rewrite Prev/Next Clip and enables Apply Clip as the control information to be transmitted to the portable terminal 200 in step S301. On the other hand, if the detection result in step S400 indicates that the recording operation is not in progress, the process advances to step S402. In step S402, the control unit 10 generates information which enables Rewrite Prev/Next Clip and disables Apply Clip as the control information to be transmitted to the portable terminal 200 in step S301. Note that the control unit 10 may generate information simply indicating that the recording operation is in progress in place of the aforementioned operation in step S401. Likewise, the control unit 10 may generate information simply indicating that the recording operation is not in progress in place of the aforementioned operation in step S402.

The operation of the portable terminal 200 which can edit additional information will be described below with reference to the flowchart shown in FIG. 5 and screen display examples shown in FIGS. 6A and 6B. Note that respective processes in FIG. 5 are implemented when the control unit 21 included in the portable terminal 200 expands programs stored in the ROM 25 onto the RAM 26 and executes the expanded programs. When the portable terminal 200 is set in an external device control mode by a user operation for the operation unit 23, the processing shown in FIG. 5 is started. FIGS. 6A and 6B show examples of screens displayed on the display unit 22 of the portable terminal 200 set in the external device control mode. In this case, an operation for transmitting additional information edited by the portable terminal 200 to the digital video camera 100 will be described separately in a case in which the recording operation of the digital video camera 100 is in progress and in a case in which the recording operation is not in progress.

An additional information edit screen 600 shown in FIG. 6A is displayed to execute an operation for editing additional information to be recorded in association with a recorded clip and transmitting data to the digital video camera 100 when the recording operation of the digital video camera 100 is in progress. The user edits respective items by operating arrow keys included in the operation unit 23. A clip title field 601 is used to input a title of a clip. A user field 602 is used to input a user whose captures the clip. An imaging location field 603 is used to input an imaging location of the clip. An imaging substance field 604 is used to input the imaging substance of the clip. An Apply Clip button 605 is a third display item used to transmit an Apply Clip command and additional information data to the digital video camera 100 via the wireless communication unit 24 so as to record the input additional information in association with a currently recording clip.

An additional information edit screen 608 shown in FIG. 6B is used to execute an operation for editing additional information to be recorded in association with a recorded clip, and transmitting data to the digital video camera 100 when the recording operation of the digital camera 100 is not in progress. The user edits respective items by operating arrow keys included in the operation unit 23. The substances of the fields 601 to 604 are the same as those in the description of the additional information edit screen 600. A Rewrite Prev button 606 is a first display item used to transmit a Rewrite Prev command and additional information data to the digital video camera 100 via the wireless communication unit 24 so as to record the input additional information in association with a clip recorded by the immediately preceding recording operation. A Next Clip button 607 is a second display item used to transmit a Next Clip command and additional information data to the digital video camera 100 via the wireless communication unit 24 so as to record the input additional information in association with a clip to be recorded.

The overall processing sequence by the portable terminal 200 according to the first embodiment will be described below with reference to FIG. 5. After the external device control mode is set, the control unit 21 receives, from the digital video camera 100, control information of the digital video camera 100 via the wireless communication unit 24 in step S500. The control unit 21 checks in step S501 based on the control information received in step S500 whether or not the recording operation of the digital video camera 100 is in progress. If it is determined that the recording operation is in progress, the process advances to step S502; otherwise, the process advances to step S508. Note that if the information generated in step S401 above is received, it is determined in step S501 that the recording operation of the digital video camera 100 is in progress; if the information generated in step S402 is received, it is determined that the recording operation of the digital video camera 100 is not in progress.

In step S502, the control unit 21 clears the Rewrite Prev button 606 and Next Clip button 607 displayed on the additional information edit screen 608 displayed when the recording operation is not in progress. Note that the Rewrite Prev button 606 and Next Clip button 607 are displayed on the additional information edit screen 608 in step S509 (to be described later). In step S503, the control unit 21 displays the Apply Clip button 605 used to transmit data of additional information to be recorded in association with a currently recording clip by the digital video camera 100 and a command on the additional information edit screen 600. As a result, when the recording operation of the digital video camera 100 is in progress, the additional information edit screen 600 is displayed on the display unit 22.

The control unit 21 checks in step S504 whether or not the user inputs data to any of the clip title field 601, user field 602, imaging location field 603, and imaging substance field 604 shown in FIG. 6A. If it is determined that the user inputs data to any of these fields, the process advances to step S505; otherwise, the process jumps to step S506. In step S505, the control unit 21 updates the additional information edit screen 600 shown in FIG. 6A.

The control unit 21 checks in step S506 whether or not the user has pressed the Apply Clip button. Note that "press" means that the user makes a touch operation (touch-down or touch-up) for the displayed button or selects the displayed button using the operation unit 23 and then makes an enter operation. If it is determined that the user has pressed the Apply Clip button 605, the process advances to step S507; otherwise, the process jumps to step S516. In step S507, the control unit 21 generates an Apply Clip command and additional information data to be transmitted to the digital video camera 100.

On the other hand, the control unit 21 clears the Apply Clip button 605 displayed on the additional information edit screen 600 displayed when the recording operation is in progress in step S508. Then, in step S509, the control unit 21 displays the Rewrite Prev button 606 and Next Clip button 607 on the additional information edit screen. In this way, the additional information edit screen 608 (FIG. 6B) which is displayed when the recording operation of the digital video camera 100 is not in progress is displayed on the display unit 22.

The control unit 21 checks in step S510 whether or not the user inputs data to any of the fields 601 to 604 shown in FIG. 6B as in step S504. If it is determined that the user inputs data to any of these fields, the process advances to step S511; otherwise, the process jumps to step S512. In step S511, the control unit 21 updates the additional information edit screen 608 shown in FIG. 6B in accordance with information input to the fields.

The control unit 21 checks in step S512 whether or not the user has pressed the Rewrite Prev button 606. If it is determined that the user has pressed the Rewrite Prev button 606, the process advances to step S513; otherwise, the process advances to step S514. In step S513, the control unit 21 generates a Rewrite Prev command and additional information data to be transmitted to the digital video camera 100.

On the other hand, the control unit 21 checks in step S514 whether or not the user has pressed the Next Clip button 607. If it is determined that the user has pressed the Next Clip button 607, the process advances to step S515; otherwise, the process jumps to step S516. In step S515, the control unit 21 generates a Next Clip command and additional information data to be transmitted to the digital video camera 100.

The control unit 21 checks in step S516 whether or not the command and data to be transmitted to the digital video camera 100 have been generated. It is determined that the command and data have been generated when one of steps S507 S513, and S515 was processed. If it is determined that the command and data to be transmitted have been generated, the process advances to step S517; otherwise, the process returns to step S500 to repeat the aforementioned processes. In step S517, the control unit 21 transmits the generated command and additional information data to the digital video camera 100 via the wireless communication unit 24.

As described above, according to the first embodiment, depending on whether or not the recording operation of the digital video camera 100 is in progress, the buttons (Apply Clip, Rewrite Prev, and Next Clip) to be displayed on the portable terminal 200 are switched. Thus, if it is determined that the recording operation is in progress, user operations required to issue execution instructions of the Rewrite Prev and Next Clip processes are disabled, and a user operation required to issue an execution instruction of the Apply Clip process is enabled on the portable terminal 200 as the operation apparatus. On the other hand, if it is determined that the recording operation is not in progress, user operations required to issue execution instructions of the Rewrite Prev and Next Clip processes are enabled, and a user operation required to issue an execution instruction of the Apply Clip process is disabled on the portable terminal 200 as the operation apparatus. That is, the buttons to be displayed on the portable terminal 200 are switched to fit the recording state of the digital video camera 100.

For this reason, the user can surely and easily perform an operation for associating additional information with an already recorded image, an operation for recording additional information in association with an image to be recorded, and an operation for recording additional information in association with a recording image. Note that the buttons to be displayed/cleared are switched in the above embodiment. Alternatively, enabled/disabled states of the buttons may be switched, and may be presented to the user. For example, a button in an invalid state may be grayed out. As described above, according to this embodiment, the configuration of the operation buttons to be displayed on the portable terminal 200 so as to select a target to which additional information is to be appended is appropriately changed in accordance with an image recording state in the digital video camera 100. For this reason, additional information can be correctly recorded in association with an image intended by the user.

Second Embodiment

The first embodiment has presented the configuration in which the portable terminal 200 disables unnecessary buttons depending on whether or not the recording operation of the digital video camera 100 is in progress by providing control information from the digital video camera 100 to the portable terminal 200. However, due to a communication delay between the apparatuses, a mismatch may often occur between the state of the digital video camera 100 and a state recognized by the portable terminal 200. For example, the digital video camera 100 may shift to a recording state before a data input command (Rewrite Prev or Next Clip) related to a recording stopped state is transferred from the portable terminal 200 to the digital video camera 100. In the first embodiment, the data input command related to the recording stopped state is ignored in the checking processing of step S303 in such case. However, the user who transmitted the additional information from the portable terminal 200 does not recognize such case, and additional information intended by the user fails to be appended. The second embodiment will explain an image management apparatus which can appropriately append additional information even when such mismatch has occurred.

Figure 7:
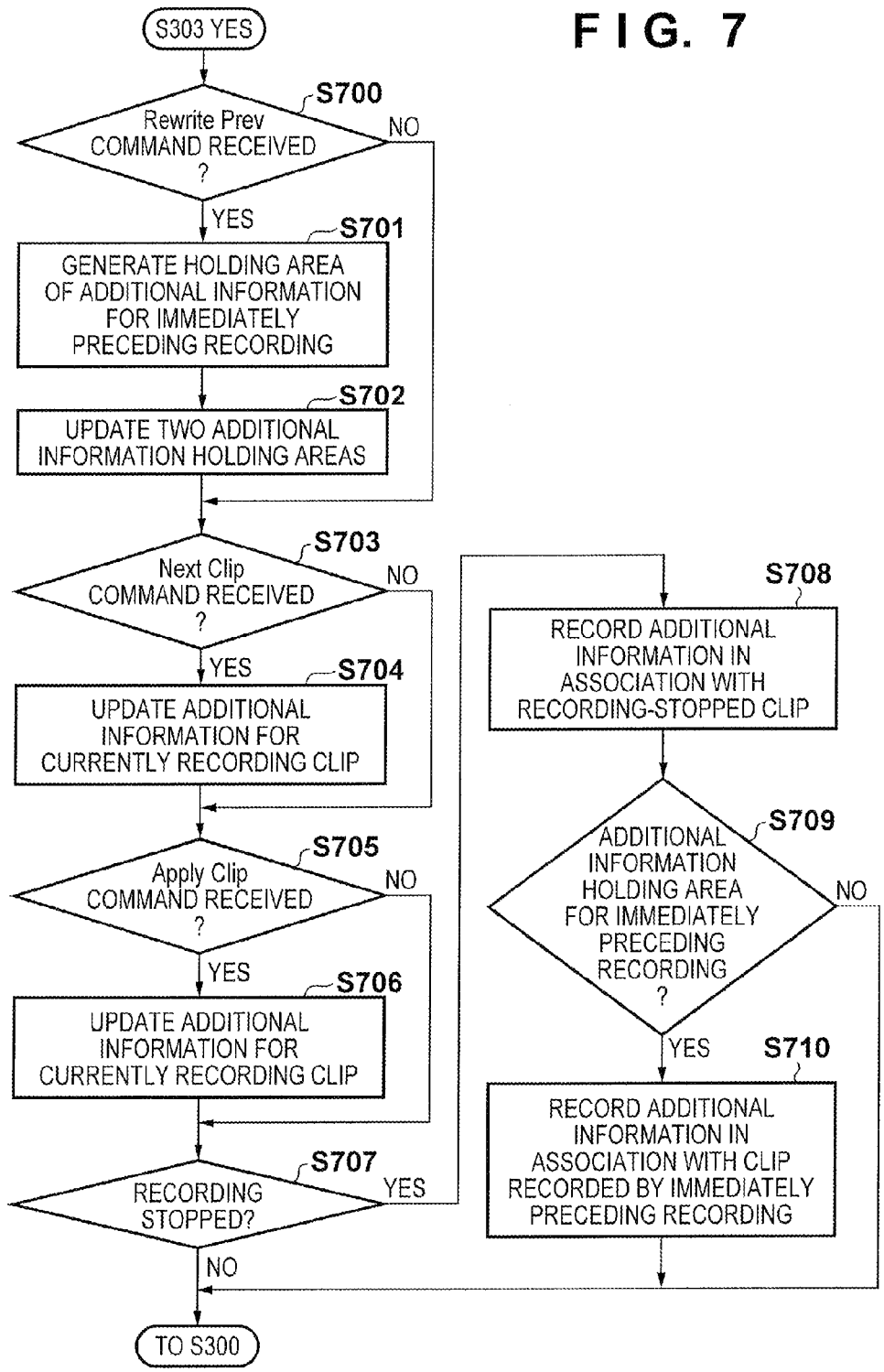
FIG. 7 is a flowchart showing the overall processing in a camera mode by the digital video camera 100 according to the second embodiment.

The arrangements of the digital video camera 100 and portable terminal 200 of the second embodiment are the same as those in the first embodiment (FIGS. 1 and 2). FIG. 7 is a flowchart for explaining the processing during a recording operation of the digital video camera 100 according to the second embodiment. Even when the digital video camera 100 of the second embodiment receives a Rewrite Prev or Next Clip command in a recording state, it does not merely ignore such command, and appropriately associates additional information with a moving image. For this purpose, in the digital video camera 100 of the second embodiment, the processes in steps S304 to S307 of FIG. 3 are replaced by those (steps S700 to S710) shown in FIG. 7.

In the same manner as in the processing of the first embodiment, the control unit 10 generates control information to be transmitted to the portable terminal 200 based on the setting state of the digital video camera 100 in step S300. In step S301, the control unit 10 transmits the control information generated in step S300 to the portable terminal 200 via the wireless communication unit 14. In step S302, the control unit 10 receives data of operation commands of the digital video camera 100 and additional information from the portable terminal 200 via the wireless communication unit 14.

Then, the control unit 10 checks in step S303 whether the recording operation of the digital video camera 100 is in progress. If the recording operation is in progress, the process advances to step S700; otherwise, the process advances to step S308. The control unit 10 checks in step S700 whether or not a Rewrite Prev command is received. If the Rewrite Prev command is received, the process advances to step S701; otherwise, the process jumps to step S703. In step S701, the control unit 10 generates a new "holding area of additional information for an image recorded by the immediately preceding recording operation" on the RAM 18 in response to reception of the Rewrite Prev command. With this processing, two additional information holding areas are formed on the RAM 18. That is, a "holding area of additional information to be appended to a currently recording image", which holds additional information acquired together with an Apply Clip command, and the "holding area of additional information to be appended to an image recorded by the immediately preceding recording operation" are formed. Next, in step S702, the control unit 10 stores the additional information received in step S302 in the two additional information holding areas, that is, the "holding area of additional information to be appended to a currently recording image" and the "holding area of additional information to be appended to an image recorded by the immediately preceding recording operation" generated in step S701.

The control unit 10 then checks in step S703 whether or not a Next Clip command is received. If it is determined that the Next Clip command is received, the control unit 10 updates, in step S704, data held in the "holding area of additional information to be appended to a currently recording image" on the RAM 18. However, data in the "holding area of additional information to be appended to an image recorded by the immediately preceding recording operation" is not updated. If it is determined that a Next Clip command is not received, the control skips step S704, and the process advances to step S705.

The control unit 10 detects in step S705 whether or not a command (Apply Clip command) to be originally received by the digital video camera 100 in the recording state is received. If it is determined that the Apply Clip command is received, the process advances to step S706; otherwise, the process jumps to step S707.

In step S706, the control unit 10 updates the substance of the "holding area of additional information to be appended to a currently recording image" by additional information received from the portable terminal 200 together with the Apply Clip command. However, the substance of the "holding area of additional information to be appended to an image recorded by the immediately preceding recording operation" as the other area of the two additional information holding areas is not updated.

The control unit 10 checks in step S707 whether or not a recording stop request is received. If the recording stop request is received, the process advances to step S708. In step S708, the control unit 10 records the data held in the "holding area of additional information to be appended to a currently recording image" in the recording medium 20 in association with a clip whose recording operation is stopped. Then, the control unit 10 checks in step S709 whether or not the "holding area of additional information to be appended to an image recorded by the immediately preceding recording operation" is generated in step S701. If it is determined that the "holding area of additional information to be appended to an image recorded by the immediately preceding recording operation" is generated, the process advances to step S710; otherwise, the process returns to step S300.

In step S710, the control unit 10 records, in the recording medium 20, the data in the "holding area of additional information to be appended to an image recorded by the immediately preceding recording operation" generated in step S704 in association with a clip recorded by the recording operation immediately before the recording-stopped clip in the recording medium 20. In this way, the Rewrite Prev command received after the recording operation is started can be correctly reflected. After that, when the recording state of the digital video camera 100 matches that recognized by the portable terminal 200, the operation of the Rewrite Prev or Next Clip command is disabled, and the processes in steps S700 to S704 are not executed. Note that an execution period of steps S700 to S704 upon switching from "recording standby" to "recording in progress" may be limited by a timer which is activated at the switching timing to "recording in progress".

As described above, according to the second embodiment, even when a command to be issued in the recording stopped state is received from the portable terminal 200 while the digital video camera 100 is in the recording state, additional information can be correctly associated with a clip selected by the user.

Third Embodiment

The second embodiment has explained the operation executed when the digital video camera 100 receives, during the recording operation, a command (Rewrite Prev/Next Clip) to be issued in the recording stopped state. The third embodiment will explain an arrangement which correctly associates additional information with an image (clip) even when the digital video camera 100 receives, in the recording stopped state, a command (Apply Clip) to be issued in the recording operation state. Note that the arrangements of the digital video camera 100 and portable terminal 200 of the third embodiment are the same as those in the first embodiment (FIGS. 1 and 2). The operation of the digital video camera 100 according to the third embodiment will be described below with reference to the flowchart shown in FIG. 8.

Figure 8:
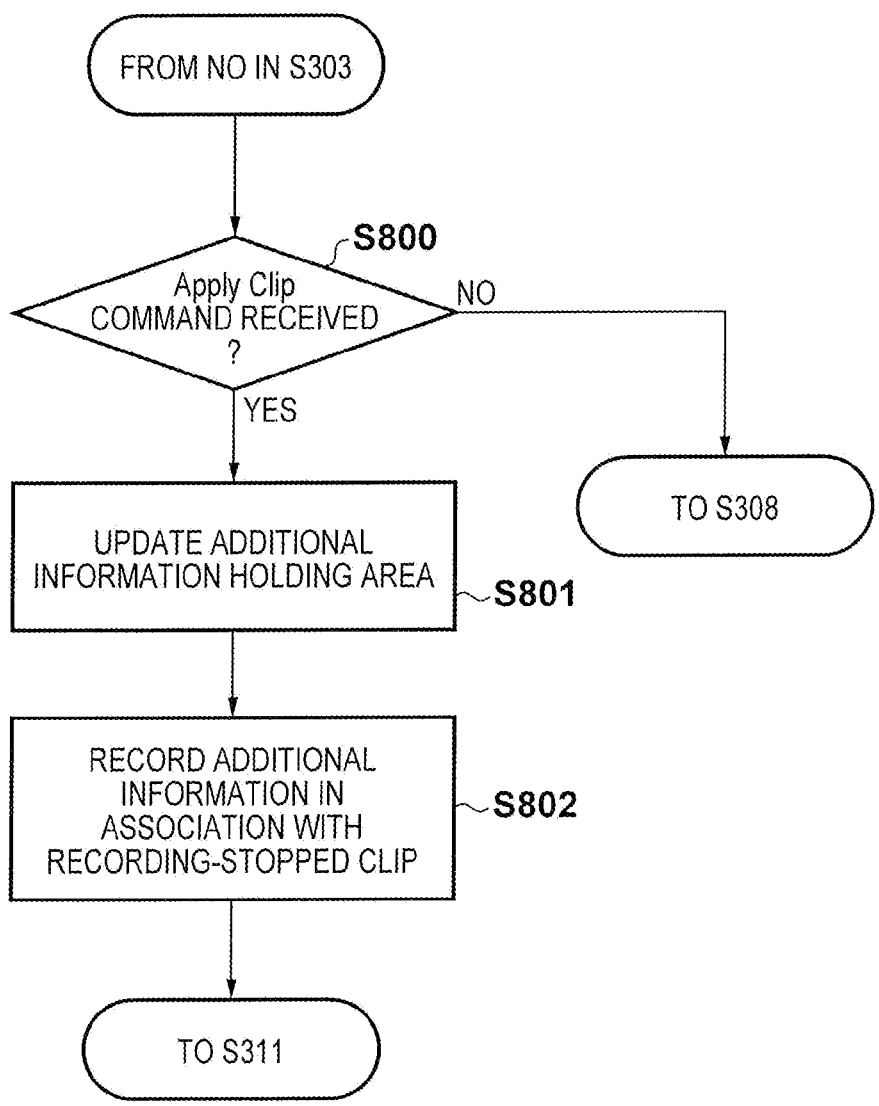
FIG. 8 is a flowchart of the digital video camera 100 according to the third embodiment.

FIG. 8 is a flowchart showing the operation of the digital video camera 100 executed when the digital video camera 100 in the recording stopped state receives a data input command (Apply Clip) to be issued during the recording operation from the portable terminal 200. The processing shown in FIG. 8 is to be inserted between step S303 (NO) and step S308 in FIG. 3. Note that the aforementioned mismatch state occurs due to a communication delay between the apparatuses. For example, the mismatch state occurs when the digital video camera 100 shifts to the recording stopped state while a data input command related to the recording state is transferred from the portable terminal 200 to the digital video camera 100.

In the same manner as in the processing of the first embodiment, the control unit 10 generates control information (including information as to whether or not the recording operation is in progress or whether or not respective commands are invalid) to be transmitted to the portable terminal 200 based on the setting state of the digital video camera 100 in step S300. In step S301, the control unit 10 transmits the control information generated in step S300 to the portable terminal 200 via the wireless communication unit 14. In step S302, the control unit 10 receives data of operation commands of the digital video camera 100 and additional information from the portable terminal 200 via the wireless communication unit 14.

If it is determined in step S303 that the recording operation of the digital video camera 100 is not in progress, the process advances to step S800. The control unit 10 checks in step S800 whether or not an Apply Clip command is received. If it is determined that the Apply Clip command is received, the process advances to step S801; otherwise, the process advances to step S308. In step S801, the control unit 10 updates data held in the additional information holding area on the RAM 18 by the data received in step S302 in response to reception of the Apply Clip command. In step S802, the control unit 10 records additional information in the recording medium 20 in association with a clip whose recording operation is stopped just before (a recorded latest image whose recording operation in the recording medium 20 is stopped just before). Then, the process advances to step S311. After that, when the recording state of the digital video camera 100 matches that recognized by the portable terminal 200, the operation of the Apply Clip command is disabled, and the processes in steps S800 to S802 are not executed. Note that an execution period of steps S800 to S802 upon switching from "recording in progress" to "recording standby" may be limited by a timer which is activated at the switching timing to "recording in progress".

As described above, according to the third embodiment, even when the digital video camera 100 in the recording stopped state receives a command (Apply Clip) to be issued during the recording operation from the portable terminal 200, additional information can be correctly recorded in association with a clip selected by the user.

As described above, according to the first to third embodiments, the configuration of the operation buttons on the terminal is changed according to the recording state of an image in the image management apparatus. For this reason, the user can correctly recognize whether "additional information is to be associated with an already recorded image", "additional information is to be associated with an image to be recorded", or "additional information is to be associated with a currently recording image" when the additional information is recorded.

Note that in the aforementioned first to third embodiments, the portable terminal 200 independent of the digital video camera 100 allows the user to designate the substance of additional information for an image, and a target image to which that information is to be appended. When a system with such arrangement is used, at a movie shooting site or the like, a director, a camera operator who captures an image using the digital video camera 100, and a staff who inputs additional information using the portable terminal 200 may work on their tasks as different persons. In such case, it is difficult to link the camera operation timing of the camera operator with the appending timing of additional information by the input staff who inputs additional information, and erroneous operations readily occur. Hence, the present invention is particularly effective for such case.

The operations which can be executed on the portable terminal 200 described in the aforementioned first to third embodiments may be executed via the display unit 15 and operation unit 16 included in the digital video camera 100. That is, the processes executed on the digital video camera 100 side and the portable terminal 200 side can also be executed on the digital video camera 100 side. In other words, the first to third embodiments are applicable to a case in which an image management apparatus as a single apparatus executes both image recording processing and processing for inputting the substance of additional information and selecting an appending target image as in the seventh and 11th embodiments (to be described later). That is, the control operations of the control units 10 and 21 may be implemented by one hardware component or when a plurality of hardware components share processing.

Fourth Embodiment

As described above, the following three input timings of the substance of additional information to be associated with an image by the user are assumed:
 a first process: after an image is captured (recorded), additional information to be appended to an image recorded by the immediately preceding recording operation is input and associated;
 a second process: before an image is captured (recorded), additional information to be appended to an image to be captured is input and designated; and
 a third process: during capturing (recording) of an image (especially, a moving image), additional information to be appended to a currently capturing image is input.

The timing of the third processing is that exclusive for the moving image capturing timing, but the timings of the first and second processes are those possible for both a still image and moving image and are those in an imaging standby state. That is, when the user inputs additional information in an imaging standby state, a target image to which the user wants to append that information includes an image captured by the immediately preceding imaging operation, that is, a latest image of already recorded images (first process), and an image to be captured (second process).

In order to enable both the first and second processes, every time the user inputs additional information, an operation for selecting whether an appending target of that additional information is an image to be captured or a latest image of already recorded images is required. However, such an operation is troublesome when the user is shooting in a hurry, and may result in an erroneous operation. In particular, when the latest image captured by the immediately preceding imaging operation is erased, an image captured by an imaging operation before said immediately preceding imaging operation newly becomes the latest image of already recorded images. There is possibility that the user who inputs additional information may not recognize the content of such latest image. When such a situation occurs, if an operation for recording additional information in association with the latest image of the already recorded images is executed, the additional information may be wrongly recorded in association with an unintended image. Such a problem similarly occurs for other contents data, such as audio data.

Therefore, this fourth embodiment and the following fifth to seventh embodiments will explain an arrangement which can eliminate the possibility of recording additional information in association with an unintended content when the substance of the latest content of the already recorded contents can no longer be recognized.

The fourth embodiment will exemplify an image management apparatus which associates additional information with image data as a content management apparatus and content management system, which associate additional information with contents data. The image management apparatus (image management system) according to the fourth embodiment is configured by, for example, connecting the digital video camera 100 (camcorder) shown in FIG. 1 and the portable terminal 200 shown in FIG. 2 to be able to communicate with each other as in the first embodiment.

Figure 9:
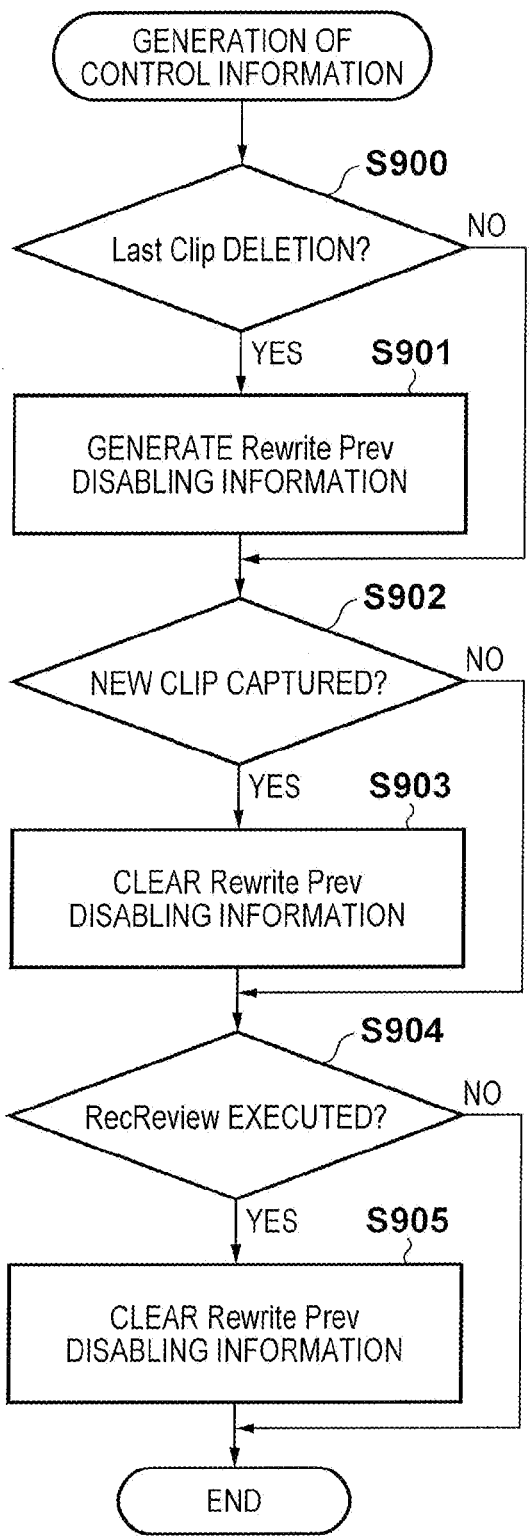
FIG. 9 is a flowchart showing the control information generation processing of the digital video camera 100 according to the fourth embodiment.

The processing in the digital video camera 100 and portable terminal 200 according to this embodiment will be described below with reference to the flowcharts shown in FIGS. 3, 9, 10A, and 10B. The respective processes shown in the flowcharts of FIGS. 3 and 9 are implemented when the control unit 10 included in the digital video camera 100 expands programs stored in the ROM 17 onto the RAM 18 and executes the expanded programs. When the digital video camera 100 is set in a camera mode (imaging mode) by a user operation for the operation unit 16, the processing shown in FIG. 3 is started. Note that the processing shown in the flowchart of FIG. 3 is as described in the first embodiment.

Figure 11:
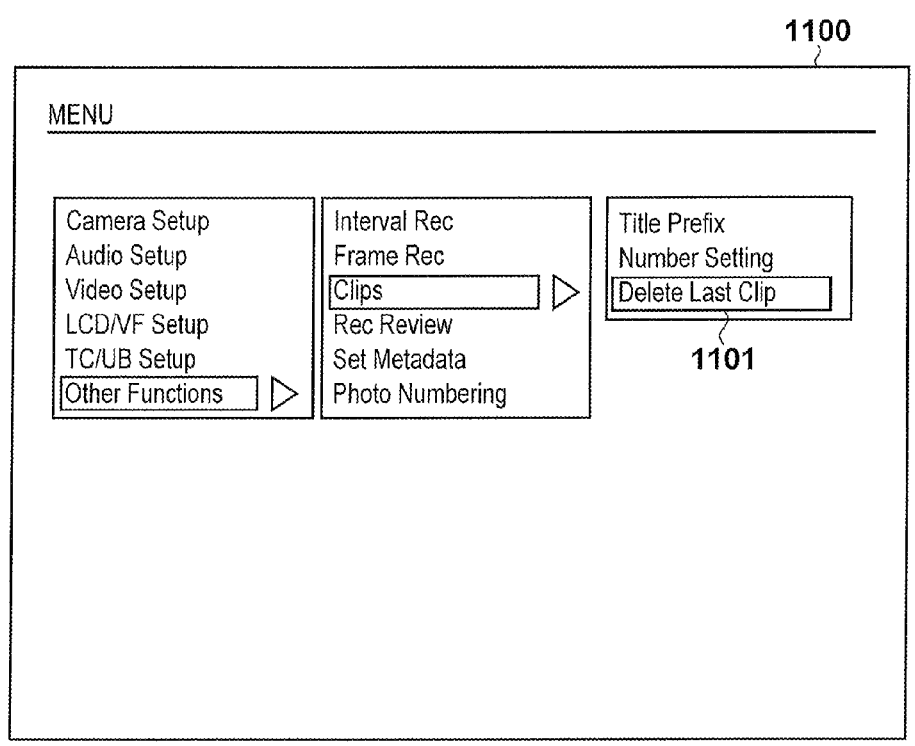
FIG. 11 is a view showing a display example of a menu screen of the digital video camera 100.

FIG. 9 is a flowchart showing details of the control information generation processing (S300) in FIG. 3. The control unit 10 checks in step S900 whether or not a last captured clip is deleted (to be referred to as "Last Clip deletion" hereinafter). If it is determined that the Last Clip deletion is executed, the process advances to step S901; otherwise, the process jumps to step S902. In step S901, the control unit 10 generates "Rewrite Prev disabling information" as control information to be transmitted to the portable terminal 200 in step S301 of FIG. 3, and records the generated information in the RAM 18. In this case, the reason why the Rewrite Prev command is disabled is that the latest image data of those recorded in the recording medium 20 cannot match an image which was actually recorded by an immediately preceding imaging operation as a result of the Last Clip deletion. That is, the digital video camera 100 is no longer set in a state in which an image recorded by the immediately preceding imaging operation can be specified. Note that it is determined that the Last Clip deletion is executed in the following cases:

when the user opens a menu 1100 shown in FIG. 11 by pressing a menu button included in the operation unit 16 and instructs to delete a last captured clip from items of the menu 1100;

when the user operates a selection cursor 1101 using arrow buttons included in the operation unit 16 and instructs to execute the Last Clip deletion by selecting a Last Clip deletion item ("Delete Last Clip" in FIG. 11) from the menu; or when the user instructs to execute the Last Clip deletion by pressing a Last Clip deletion button included in the operation unit 16.

The control unit 10 checks in step S902 whether or not a new clip is captured. Note that it is determined in step S902 that a new clip is captured in the following case. That is, this determination is made when the user issues a recording start instruction of moving image data, and then issues a recording stop instruction. In this case, for example, the recording start instruction is issued by pressing an imaging start button included in the operation unit 16 or by receiving a recording start command in step S302 in FIG. 3. Also, the recording stop instruction is issued by pressing an imaging stop button or by receiving a recording stop command in step S302 in FIG. 3. If it is determined that the new clip is captured, the process advances to step S903; otherwise, the process jumps to step S904. In step S903, the control unit 10 clears the aforementioned "Rewrite Prev disabling information" as the control information to be transmitted to the portable terminal 200 in step S301 in FIG. 3, that is, it enables the Rewrite Prev command.

The control unit 10 checks in step S904 whether or not the last captured clip (the latest clip of the already recorded clips) is played back (to be referred to as "RecReview" hereinafter). If it is determined that the RecReview operation is executed, the process advances to step S905; otherwise, the control information generation processing ends. In step S905, the control unit 10 clears the "Rewrite Prev disabling information" as the control information to be transmitted to the portable terminal 200 in step S301 in FIG. 3; that is, it enables the Rewrite Prev command as in step S903. This is because since an access is made to the latest image of those recorded in the recording medium 20, the user can recognize that latest image as a last captured image. Then, after the processing of step S905 ends, the control information generation processing ends. Note that it is determined in step S904 that the RecReview operation is executed in, for example, the following cases:

when the user opens the menu 1100 shown in FIG. 11 by pressing the menu button included in the operation unit 16 and instructs to play back the last captured clip (the latest clip of the already recorded clips) from items of the menu 1100; or when the user instructs to play back the last captured clip by pressing a RecReview button included in the operation unit 16.

Figure 10A:
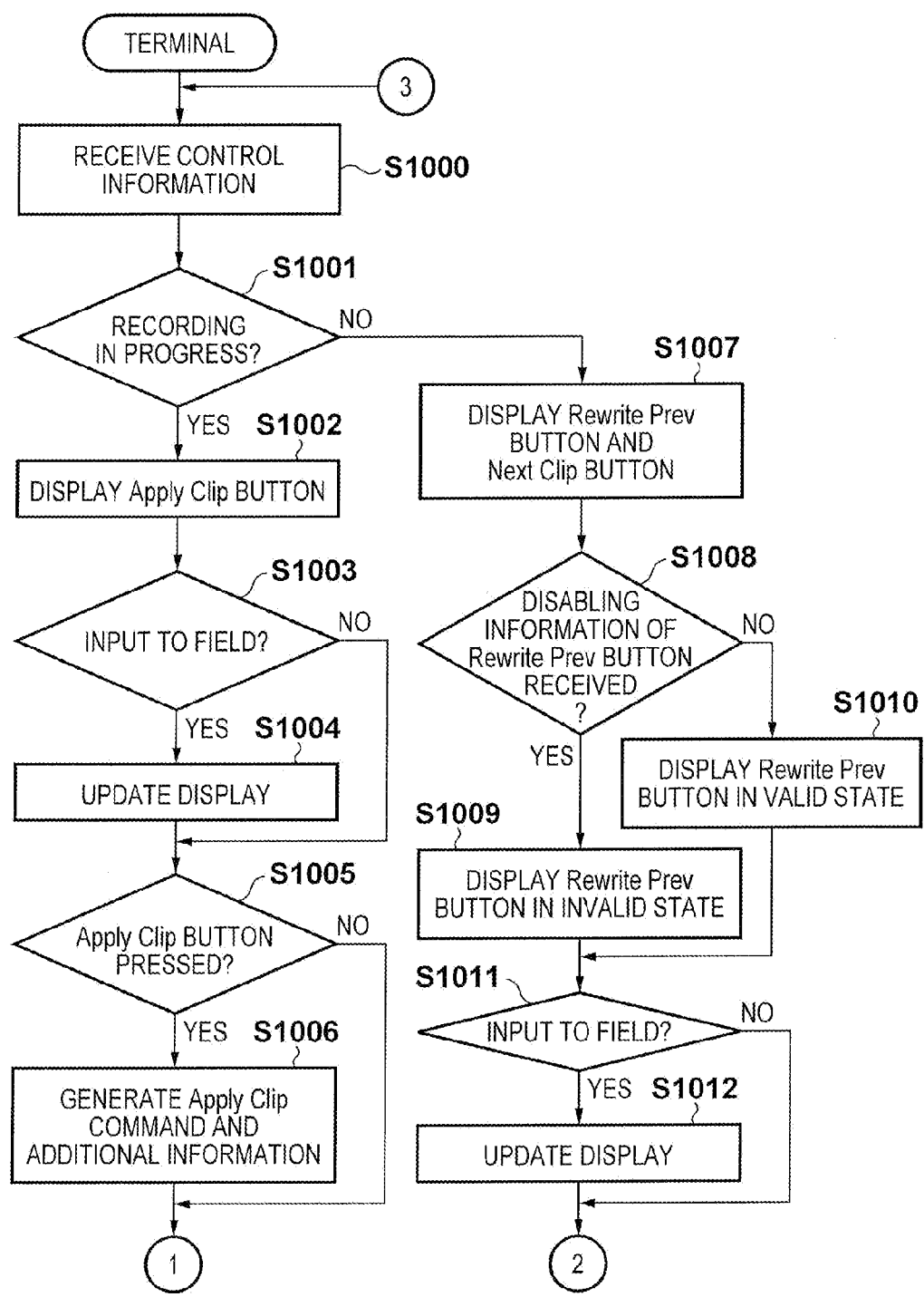

As described above, control information in which the Rewrite Prev command is enabled in a state in which an image recorded by the immediately preceding recording operation can be specified or it is disabled in a state in which an image recorded by the immediately preceding recording operation cannot be specified is transmitted to the portable terminal 200. The portable terminal 200 enables or disables a user operation of the Rewrite Prev button according to this control information. Processes shown in FIGS. 10A and 10B are implemented when the control unit 21 of the portable terminal 200 expands programs stored in the ROM 25 onto the RAM 26 and executes the expanded programs. When the portable terminal 200 is set in an external device control mode by a user operation for the operation unit 23, the processes shown in FIGS. 10A and 10B are started. Examples of the screens displayed on the display unit 22 of the portable terminal 200 in the external device control mode are as shown in FIGS. 6A and 6B. Each of the additional information edit screens shown in FIGS. 6A and 6B is a screen which allows the user to edit additional information to be recorded in association with a clip captured by the digital video camera 100 and to transmit data to the digital video camera 100. Using the screens shown in FIGS. 6A and 6B, the user makes an operation for transmitting additional information edited using the portable terminal 200 to the digital video camera 100.

FIGS. 10A and 10B are flowcharts showing the overall processing sequence of the portable terminal 200. After the external device control mode is set, the control unit 21 receives, from the digital video camera 100, control information of the digital video camera 100 via the wireless communication unit 24 in step S1000. The control unit 21 checks in step S1001 based on the control information received in step S1000 whether or not a moving image recording operation of the digital video camera 100 is in progress. If it is determined that the recording operation is in progress, the process advances to step S1002; otherwise, the process advances to step S1007. Assume that the control information transmitted from the digital video camera 100 includes information indicating whether or not the moving image recording operation of the digital video camera 100 is in progress, and this information is referred to in step S1001. The control information indicating whether or not the moving image recording operation is in progress is generated in, for example, step S300 in FIG. 3.

In step S1002, the control unit 21 displays an Apply Clip button used to transmit data of additional information to be recorded in association with a currently recording clip by the digital video camera 100 and a command, as shown in the additional information edit screen 600 of FIG. 6A. The control unit 21 checks in step S1003 whether or not the user inputs data to any of the clip title field 601, user field 602, imaging location field 603, and imaging substance field 604 shown in FIG. 6A. If it is determined that the user inputs data to any of these fields, the process advances to step S1004; otherwise, the process jumps to step S1005. In step S1004, the control unit 21 updates the additional information edit screen shown in FIG. 6A according to data input to the fields.

The control unit 21 checks in step S1005 whether or not the user has pressed the Apply Clip button. Note that "press" means that the user makes a touch operation (touch-down or touch-up) for the displayed button or selects the displayed button using the operation unit 23 and then makes an enter operation. If it is determined that the user has pressed the Apply Clip button, the process advances to step S1006; otherwise, the process jumps to step S1019. In step S1006, the control unit 21 generates an Apply Clip command and additional information data to be transmitted to the digital video camera 100.

On the other hand, in step S1007, the control unit 21 displays the Rewrite Prev button 606 and Next Clip button 607 on the additional information edit screen 608, as shown in FIG. 6B. The control unit 21 checks in step S1008 whether or not the control information received in step S1000 includes Rewrite Prev disabling information, that is, whether or not Rewrite Prev disabling information is received. If the Rewrite Prev disabling information is received, the process advances to step S1009; otherwise, the process advances to step S1010. In step S1009, the control unit 21 displays the Rewrite Prev button 606 in an invalid state to clearly specify a state in which the Rewrite Prev command cannot be generated. The button is displayed in the invalid state by, for example, graying out that button (or displaying that button using a different color so as to allow the user to identify that the button is disabled). Note that a display mode may be changed to allow the user to recognize that the button is disabled even by pressing that button in addition to the gray-out display. In step S1010, the control unit 21 displays the Rewrite Prev button 606 in a valid state.

The control unit 21 checks in step S1011 whether or not the user inputs data to any of the fields shown in FIG. 6B as in step S1003. If it is determined that the user inputs data to any of the fields, the process advances to step S1012; otherwise, the process jumps to step S1013. In step S1012, the control unit 21 updates the additional information edit screen 608 shown in FIG. 6B.

The control unit 21 checks in step S1013 whether or not the user has pressed the Rewrite Prev button 606. If it is determined that the user has pressed the Rewrite Prev button 606, the process advances to step S1014; otherwise, the process advances to step S1017. The control unit 21 checks in step S1014 whether or not the Rewrite Prev button 606 is displayed in the invalid state. If it is determined that the Rewrite Prev button 606 is displayed in the invalid state, the process advances to step S1015; otherwise, the process advances to step S1016. In step S1015, the control unit 21 displays a warning message indicating that the Rewrite Prev button 606 is disabled, and neither a command nor additional information data is transmitted to the digital video camera 100 even by pressing that button on the display unit 22. In step S1016, the control unit 21 generates a Rewrite Prev command and additional information data to be transmitted to the digital video camera 100.

On the other hand, the control unit 21 checks in step S1017 whether or not the user has pressed the Next Clip button 607. If it is determined that the user has pressed the Next Clip button 607, the process advances to step S1018; otherwise, the process jumps to step S1019. In step S1018, the control unit 21 generates a Next Clip command and additional information data to be transmitted to the digital video camera 100.

The control unit 21 checks in step S1019 whether or not the command and data to be transmitted to the digital video camera 100 have been generated. It is determined in step S1019 that the command and data have been generated when one of the aforementioned processes of steps S1006, S1016, and S1018 was executed. If it is determined that the command and data to be transmitted have been generated, the process advances to step S1020; otherwise, the process returns to step S1000 to repeat the aforementioned processes. In step S1020, the control unit 21 transmits the generated command and additional information data to the digital video camera 100 via the wireless communication unit 24.

As described above, according to the fourth embodiment, when the Last Clip deletion is executed in the digital video camera 100 and the substance of the last captured clip can no longer be recognized, the Rewrite Prev operation is disabled. That is, when the latest data of images (clips) recorded in the recording medium 20 does not match the last recorded data, the Rewrite Prev operation is disabled. For this reason, when the substance of the last captured clip can no longer be recognized, the user can be prevented from recording additional information in association with an unintended clip from the portable terminal 200. By playing back the last captured clip by the RecReview operation, the Rewrite Prev button 606 on the portable terminal 200 is displayed in the valid state, and the user can record additional information in association with the latest clip of the already recorded clips again.

Fifth Embodiment

Figure 12:
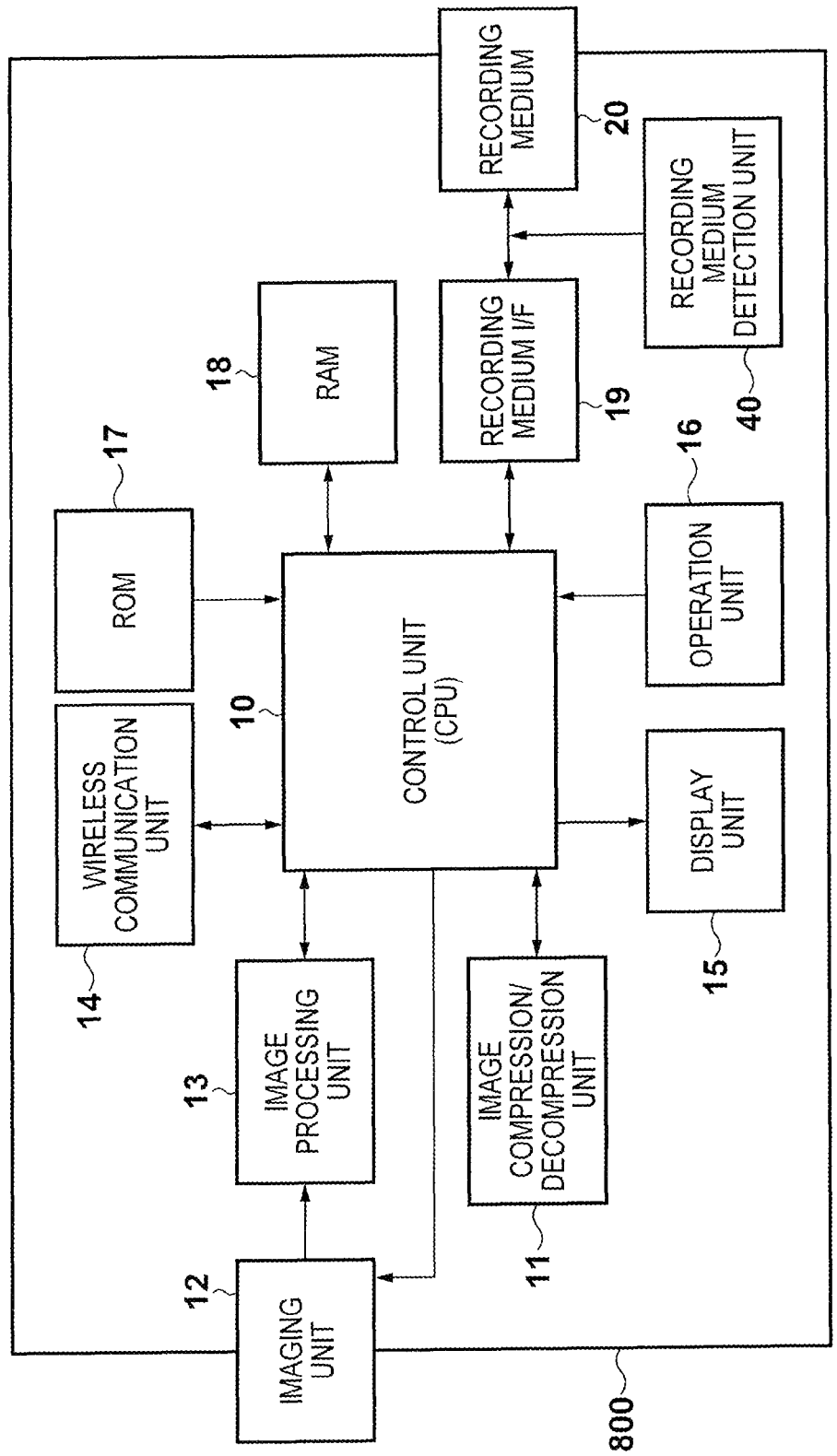
FIG. 12 is a hardware block diagram of a digital video camera 800 according to the fifth embodiment.

FIGS. 12 and 2 show an example of the arrangement of an image management apparatus according to the fifth embodiment. The image management apparatus of the fifth embodiment is configured by, for example, connecting a digital video camera 800 (camcorder) shown in FIG. 12 and the portable terminal 200 shown in FIG. 2 to be able to communicate with each other.

In FIG. 12, a recording medium detection unit 40 is added to the arrangement shown in FIG. 1. The recording medium detection unit 40 detects an attaching state of the recording medium 20 with respect to the recording medium I/F 19. Other units are the same as those in the first (fourth) embodiment (FIG. 1). The portable terminal 200 can be implemented by the same arrangement as in the first embodiment.

Figure 13:
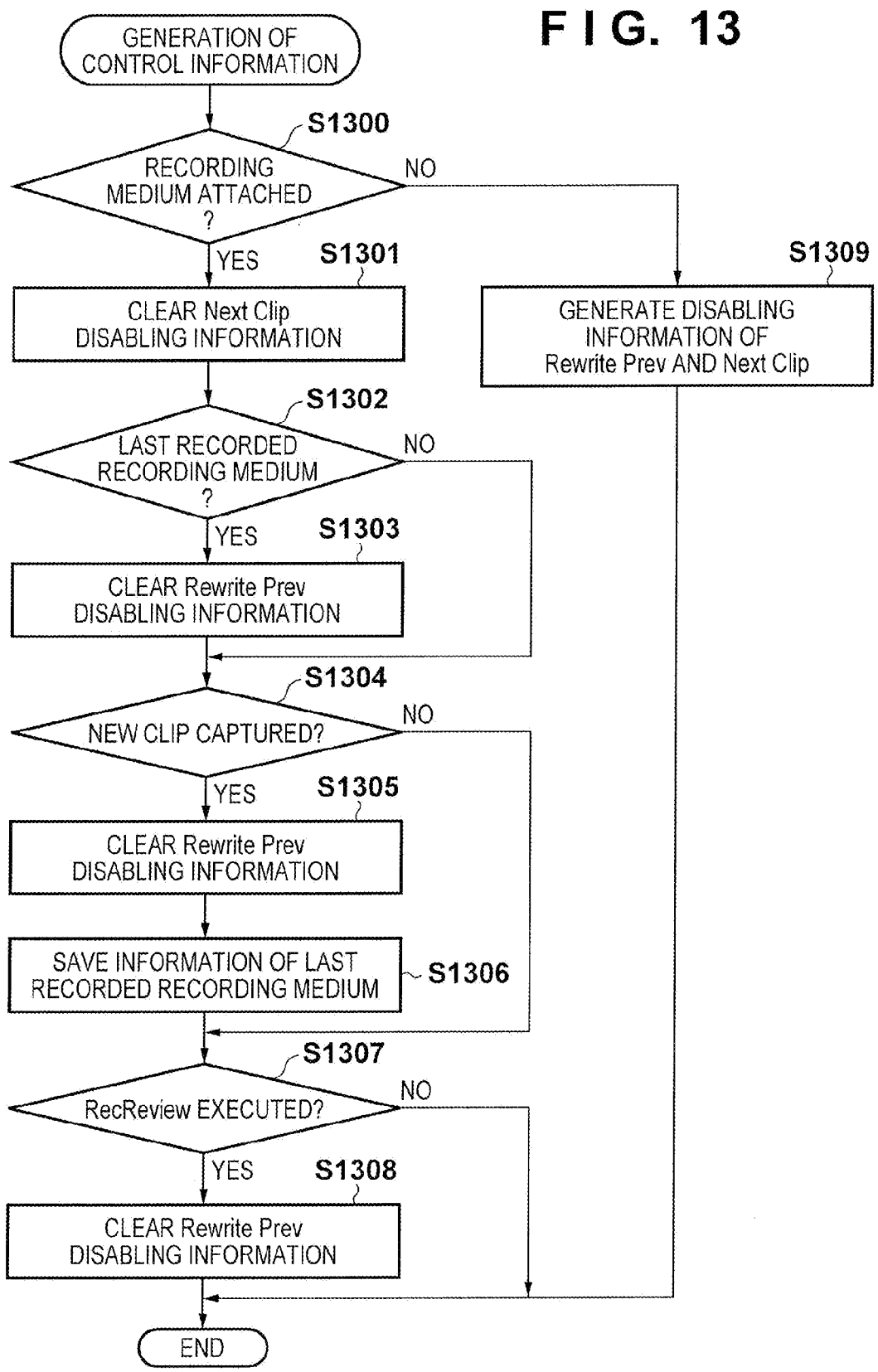
FIG. 13 is a flowchart showing the control information generation processing of the digital video camera 800 according to the fifth embodiment.

FIGS. 3, 10A, 10B, and 13 are flowcharts of the fifth embodiments. Respective processes in the flowcharts shown in FIGS. 3 and 13 are implemented when the control unit 10 of the digital video camera 800 expands programs stored in the ROM 17 onto the RAM 18 and executes the expanded programs. When the digital video camera 800 is set in a camera mode (imaging mode) by a user operation for the operation unit 16, the processing shown in FIG. 3 is started. Note that the overall processing sequence in the camera mode of the digital video camera 800 is the same as that in the first (fourth) embodiment (FIG. 3).

FIG. 13 is a flowchart showing details of the control information generation processing in step S300 in FIG. 3. The control unit 10 checks in step S1300 whether or not the recording medium 20 is attached to the recording medium I/F 19. Whether or not the recording medium 20 is attached is determined via the recording medium detection unit 40. If it is determined that the recording medium 20 is attached to the recording medium I/F 19, the process advances to step S1301; otherwise, the process advances to step S1309. In step S1301, the control unit 10 clears Next Clip disabling information in the control information to be transmitted to the portable terminal 200 in step S301 in FIG. 3, that is, it enables the Next Clip command. The control unit 10 checks in step S1302 whether or not the recording medium attached to the recording medium I/F 19 is the last recorded recording medium. Whether or not the attached recording medium is the last recorded recording medium can be determined by, for example, saving (identification) information of the last recorded recording medium in the RAM 18 and checking whether or not the saved information of the recording medium matches that of the recording medium as a current recording destination. If it is determined in step S1302 that the attached recording medium is the last recorded recording medium, the process advances to step S1303; otherwise, the process jumps to step S1304. In step S1303, the control unit 10 clears Rewrite Prev disabling information. However, when the Rewrite Prev command is disabled by the Last Clip deletion described in the fourth embodiment, it is preferable not to enable the Rewrite Prev command. Alternatively, step S1303 may be executed by adding a condition as to whether or not first attachment of the recording medium is detected since non-attachment of the recording medium is detected to that in step S1302.

The control unit 10 checks in step S1304 whether or not a new clip is captured. If it is determined that the new clip is captured, the process advances to step S1305; otherwise, the process jumps to step S1307. In step S1305, the control unit 10 clears Rewrite Prev disabling information. In step S1306, the control unit 10 saves information of the last recorded recording medium in the RAM 18. The control unit 10 checks in step S1307 whether or not a RecReview operation is executed. If it is determined that the RecReview operation is executed, the process advances to step S1308; otherwise, the processing ends. In step S1308, the control unit 10 clears Rewrite Prev disabling information.

On the other hand, in step S1309, the control unit 10 generates information indicating that the Rewrite Prev and Next Clip commands are disabled as the control information to be transmitted to the portable terminal 200 in step S301 in FIG. 3. This is because since the recording medium used so far is detached, the digital video camera 100 is no longer set in a state in which an image recorded by the immediately preceding imaging operation can be specified.

Respective processes shown in FIGS. 10A and 10B are implemented when the control unit 21 of the portable terminal 200 expands programs stored in the ROM 25 onto the RAM 26 and executes the expanded programs. When the portable terminal 200 is set in an external device control mode by a user operation for the operation unit 23, the processes shown in FIGS. 10A and 10B are started. However, this processing sequence is the same as that in the fourth embodiment, except that the fifth embodiment uses the control information generated by the processing shown in FIG. 13.

Note that the fifth embodiment executes control according to the attaching state of the detachable recording medium. However, when the recording medium I/F 19 has a lid, and an open/close state of the lid can be detected, the same control can be executed based on the open/close state of the lid. That is, the recording medium detection unit 40 functions as a lid open/close detection unit for detecting an open/close state of the lid required to cover the recording medium I/F 19 as a recording medium attaching unit. Then, if the lid open/close detection unit detects in step S1300 that the lid is open, the control unit 10 executes the processing of step S1309, that is, the processing for generating disabling information of the Rewrite Prev and Next Clip commands. If the lid open/close detection unit detects in step S1300 that the lid is closed, the processes in step S1301 and subsequent steps are executed. Of course, using both the lid open/close state and the attaching state of the recording medium to the recording medium I/F 19, whether or not to disable the Rewrite Prev and Next Clip commands may be controlled.

As described above, according to the fifth embodiment, when the recording media are replaced in the digital video camera 800, and the substance of the last captured clip can no longer be recognized, the Rewrite Prev command is disabled. For this reason, when the substance of the last captured clip can no longer be recognized, the user can be prevented from recording additional information in association with an unintended clip from the portable terminal 200. By playing back the last captured clip by the RecReview operation, the Rewrite Prev button 606 on the portable terminal 200 is displayed in the valid state, and the user can record additional information in association with the latest clip of the already recorded clips again.

Sixth Embodiment

Figure 14:
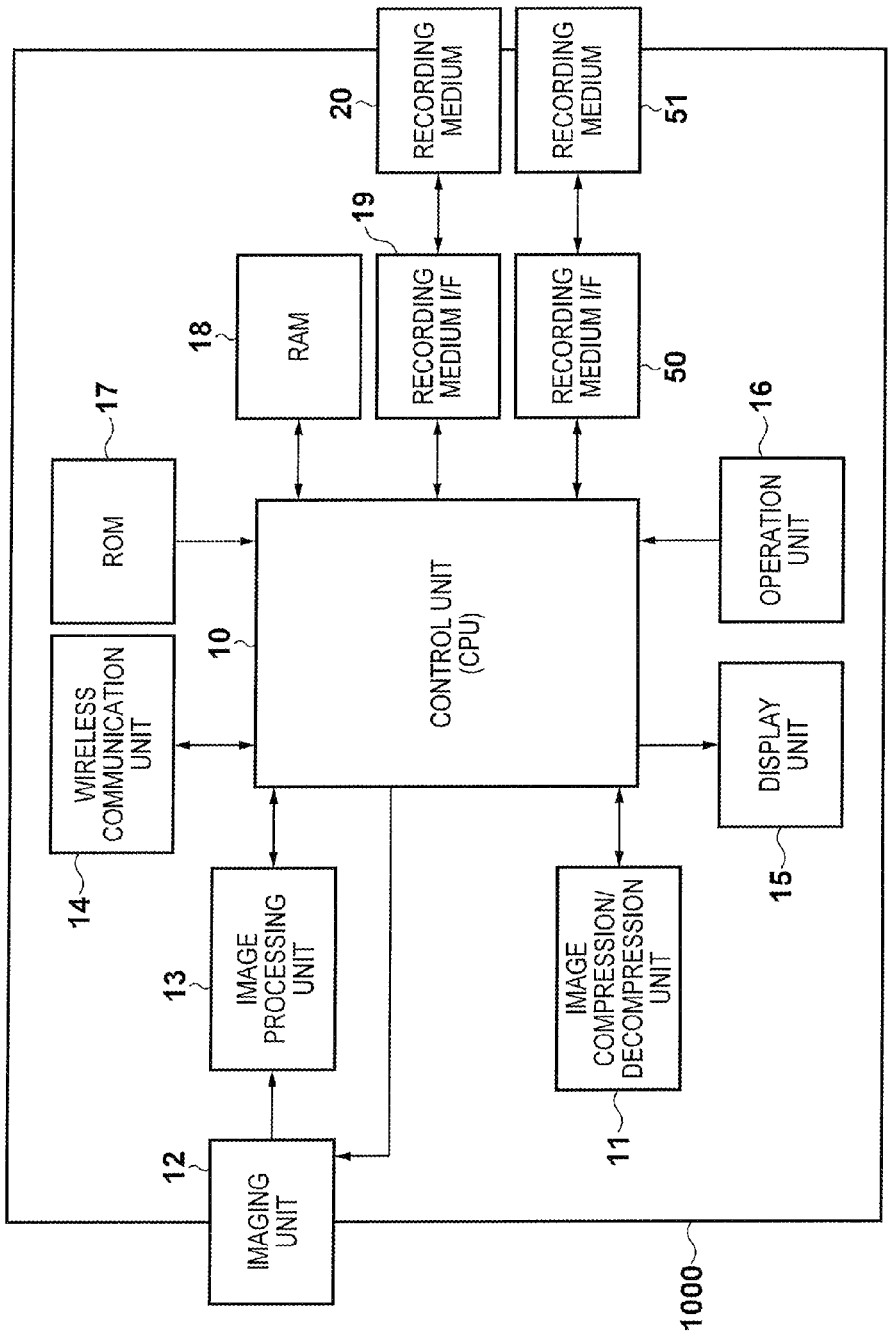
FIG. 14 is a hardware block diagram of a digital video camera 100 according to the sixth embodiment.

FIGS. 14 and 2 show an example of the arrangement of an image management apparatus according to the sixth embodiment. The image management apparatus is configured by connecting a digital video camera 1000 (camcorder) shown in FIG. 14 and the portable terminal 200 shown in FIG. 2 to be able to communicate with each other.

In FIG. 14, a recording medium I/F 50 and recording medium 51 are added to the arrangement shown in FIG. 1.

To the digital video camera 1000, two recording media required to record image data can be attached. For this purpose, the digital video camera 1000 has two interfaces, that is, the recording medium I/F 19 and recording medium I/F 50. The recording medium I/F 19 and recording medium I/F 50 are slots into which detachable recording media such as memory cards can be inserted. FIG. 14 illustrates an example in which the recording media 20 and 51 are respectively attached to the recording medium I/F 19 and recording medium I/F 50.

In the above description, the digital video camera 1000 adopts the arrangement in which image data are recorded on the detachable recording media. However, the present invention is not limited to this. For example, an arrangement using two or more memories which are not detachable and are incorporated in the digital video camera 1000 may also be used. Alternatively, a combination of a non-detachable recording medium and detachable recording medium may be used. Since other units are the same as those in the first embodiment (FIG. 1), a description thereof will not be repeated. Since the portable terminal 200 can be implemented by the same arrangement as in the first embodiment, a description thereof will not be repeated. Also, the number of recording media is not limited to two, and an arrangement in which a recording destination recording medium can be selected from a plurality of recording media may be used.

Figure 15:
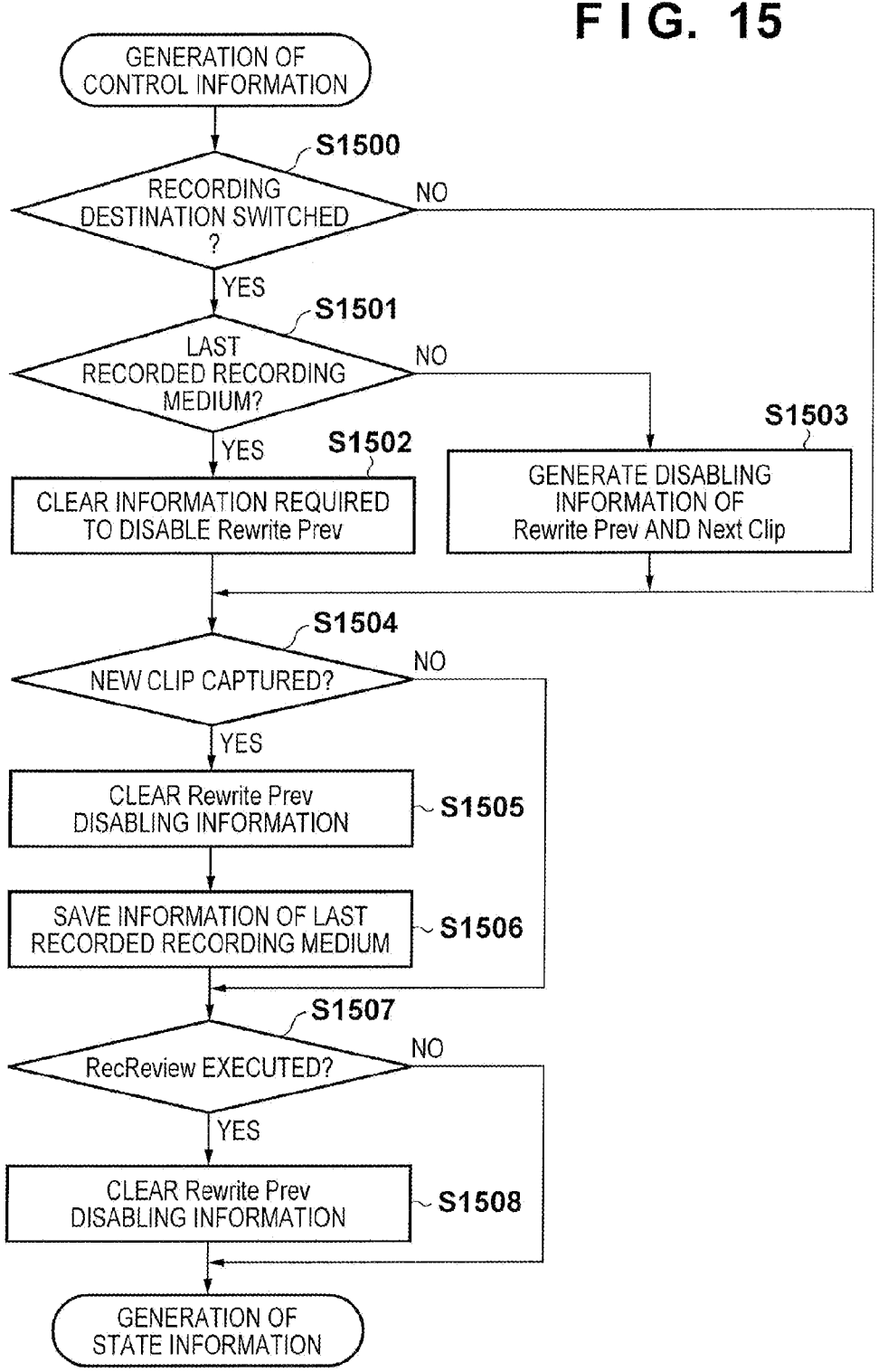
FIG. 15 is a flowchart showing the control information generation processing of the digital video camera 1000 according to the sixth embodiment.

FIGS. 3, 10A, 10B, and 15 are flowcharts of this embodiment. Respective processes in the flowcharts shown in FIGS. 3 and 15 are implemented when the control unit 10 of the digital video camera 1000 expands programs stored in the ROM 17 onto the RAM 18 and executes the expanded programs. When the digital video camera 1000 is set in a camera mode (imaging mode) by a user operation for the operation unit 16, the processing shown in FIG. 3 is started. Note that the overall processing sequence in the camera mode of the digital video camera 1000 is the same as that in the first embodiment (FIG. 3).

FIG. 15 is a flowchart showing details of the control information generation processing in step S300 in FIG. 3. The control unit 10 checks in step S1500 whether or not a recording destination recording medium of captured images is switched. For example, when the user presses a recording medium switching button included in the operation unit 16, it is determined that the recording destination recording medium is switched. If it is determined that the recording destination recording medium is switched, the process advances to step S1501; otherwise, the process jumps to step S1504. The control unit 10 checks in step S1501 whether or not the recording destination recording medium is the last recorded recording medium. If it is determined in step S1501 that the recording destination recording medium is the last recorded recording medium, the process advances to step S1502; otherwise, the process advances to step S1503.

In step S1502, the control unit 10 clears disabling information of a Rewrite Prev function as control information to be transmitted to the portable terminal 200 in step S301 in FIG. 3. In step S1503, the control unit 10 generates disabling information of Rewrite Prev and Next Clip functions as control information to be transmitted to the portable terminal 200 in step S301 in FIG. 3. This is because the recording medium used so far is no longer an access destination, and the digital video camera 1000 is no longer set in a state in which an image recorded by the immediately preceding imaging operation can be specified. Note that even when the recording destination is switched, if a recordable recording medium is attached, the enabled state of the Next Clip function may be maintained.

Steps S1504 to S1508 in FIG. 15 are the same processes as those in steps S1304 to S1308 in FIG. 13 described in the fifth embodiment.

Respective processes shown in FIGS. 10A and 10B are implemented when the control unit 21 of the portable terminal 200 expands programs stored in the ROM 25 onto the RAM 26 and executes the expanded programs. When the portable terminal 200 is set in an external device control mode by a user operation for the operation unit 23, the same processing (FIGS. 10A and 10B) as in the fourth embodiment is started. Note that the overall processing sequence in the portable terminal 200 is the same as that in the fourth embodiment, except that the control information generated by the processing shown in FIG. 15 is used.

In the sixth embodiment, switching of the recording destination recording medium is controlled based on pressing of the recording medium switching button included in the operation unit 16. The present invention is not limited to such specific case, and the recording destination may be switched in response to detection of other operations or events. For example, the recording destination may be switched:

when a recording destination recording medium is selected from a menu;

when an arrangement for detecting whether or not the recording medium is attached is available and when removal of the recording medium set as a recording destination recording medium is detected; or when the recording medium I/F 19 has a lid and an arrangement for detecting an open/close state of the lid is available and when the open state of the recording medium I/F 19 set as a recording destination recording medium is detected.

In the above description, the number of recording media is two. However, the same control is applicable to three or more recording media.

As described above, according to the sixth embodiment, when the recording destination recording medium is switched in the digital video camera 1000, and the substance of the last captured clip can no longer be recognized, the Rewrite Prev operation is disabled. For this reason, when the substance of the last captured clip can no longer be recognized, the user can be prevented from recording additional information in association with an unintended clip from the portable terminal 200. By playing back the last captured clip by the RecReview operation, the Rewrite Prev button 606 on the portable terminal 200 is displayed in the valid state, and the user can record additional information in association with the latest clip of the already recorded clips again. Furthermore, although the recording destination recording medium is switched, when the recording medium is switched to the last recorded recording medium again without recording any data on another recording medium, the Rewrite Prev button 606 on the portable terminal 200 is displayed in the valid state, and the user can record additional information in association with the latest clip of the already recorded clips again.

Seventh Embodiment

In the aforementioned fourth to sixth embodiments, the portable terminal 200 different from the digital video camera 100 (800, 1000) is used to input the substance of additional information and to select an appending target image. Alternatively, the digital video camera 100 (800, 1000) itself can execute such operations. This embodiment will explain an example in which the same processing as that executed by the portable terminal 200 in the fourth embodiment is executed in the digital video camera 100. As for the arrangement of the digital video camera 100 according to the seventh embodiment, the block diagram shown in FIG. 1 will be quoted.

FIGS. 16, 17A, 17B, and 18 are flowcharts of the seventh embodiment. Respective processes in these flowcharts are implemented when the control unit 10 included in the digital video camera 100 expands programs stored in the ROM 17 onto the RAM 18 and executes the expanded programs. When the digital video camera 100 is set in a camera mode (imaging mode) by a user operation for the operation unit 16, the processing shown in FIG. 16 is started.

FIG. 16 is a flowchart showing the overall processing sequence in the camera mode. After the camera mode is set, the control unit 10 checks in step S1600 whether or not an additional information edit screen 608 is opened on the display unit 15. For example, when the user opens a menu by pressing a menu button included in the operation unit 16 and selects an additional information edit item, it is determined that the additional information edit screen 608 is opened. The additional information edit screen is displayed on the display unit 15 included in the digital video camera 100. If it is determined that the additional information edit screen is opened, the process advances to step S1601; otherwise, the process jumps to step S1603. In step S1601, additional information edit processing is executed. Details of this processing will be described later with reference to FIGS. 17A and 17B. The control unit 10 checks in step S1602 whether or not the additional information edit screen 608 is closed. For example, when the additional information edit screen 608 includes a close button (not shown), and the user selects that button, it is determined that the additional information edit screen 608 is closed. If it is determined that the additional information edit screen 608 is closed, the process advances to step S1603; otherwise, the process returns to step S1601 to repeat the aforementioned processing. In step S1603, the control unit 10 executes recording processing. Details of this recording processing will be described later with reference to FIG. 18. After the processing of step S1603 ends, the process returns to step S1600 to repeat the aforementioned processing.

Figure 17B:
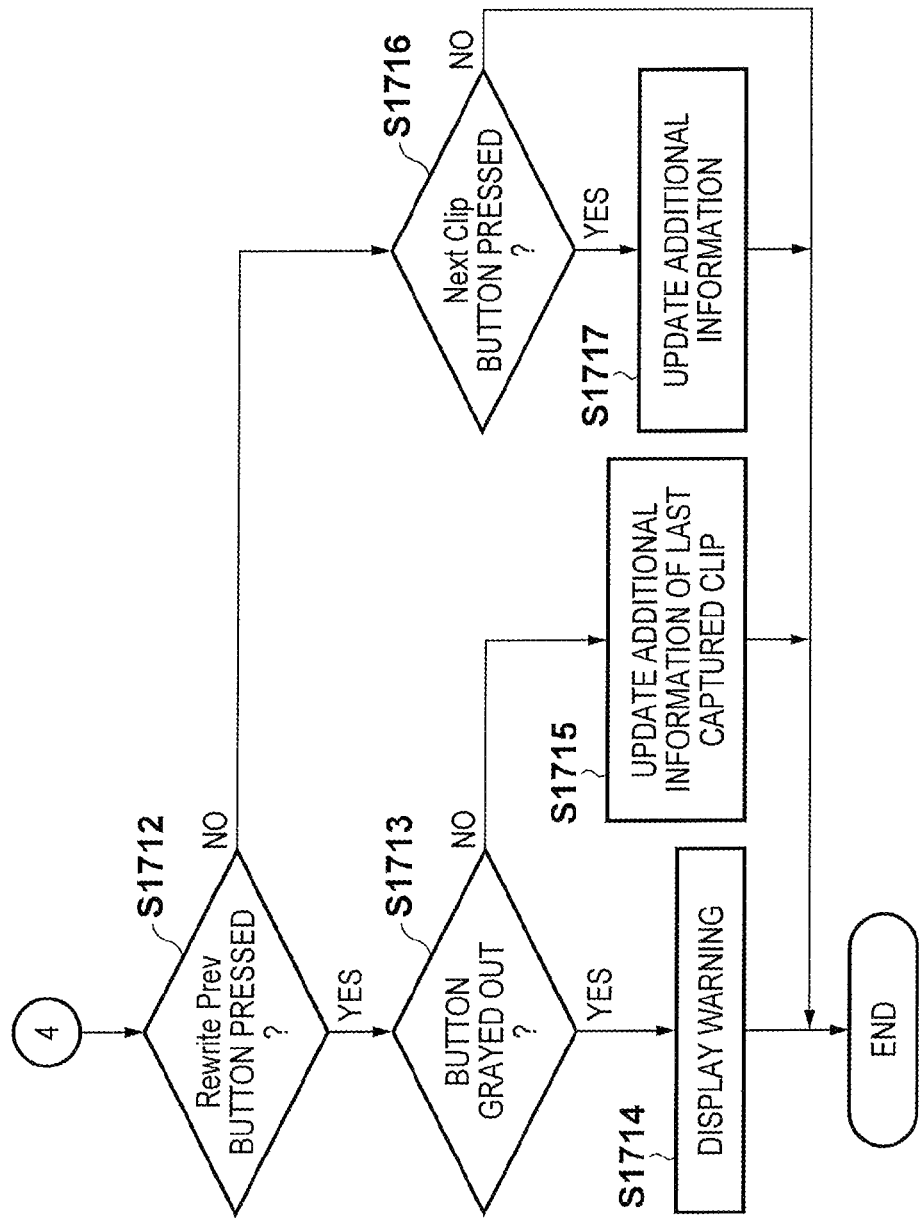

FIGS. 17A and 17B are flowcharts showing details of the additional information edit processing in step S1601 in FIG. 16. The control unit 10 checks in step S1700 whether or not a moving image recording operation of the digital video camera 100 is in progress. If it is determined that the recording operation is in progress, the process advances to step S1701; otherwise, the process advances to step S1706. Whether or not the recording operation is in progress can be checked in the same manner as in, for example, step S303. In step S1701, the control unit 10 displays the Apply Clip button 605 on the additional information edit screen 600, as shown in FIG. 6A. The control unit 10 checks in step S1702 whether or not the user inputs data to any of the clip title field 601, user field 602, imaging location field 603, and imaging substance field 604 shown in FIG. 6A. If it is determined that the user inputs data to any of these fields, the process advances to step S1703; otherwise, the process jumps to step S1704. In step S1703, the control unit 10 updates the additional information edit screen shown in FIG. 6A (the same processing as in step S1004 of FIG. 10A). The control unit 10 checks in step S1704 whether or not the user has pressed the Apply Clip button. If it is determined that the user has pressed the Apply Clip button, the process advances to step S1705; otherwise, the processing ends. In step S1705, the control unit 10 updates additional information data saved in the RAM 18 by information input to the respective fields of the additional information edit screen.

On the other hand, in step S1706, the control unit 10 displays the additional information edit screen 608, Rewrite Prev button 606, and Next Clip button 607, as shown in FIG. 6B. The control unit 10 checks in step S1707 whether or not disabling information of the Rewrite Prev button 606 is saved. If the disabling information of the Rewrite Prev button 606 is saved, the process advances to step S1708; otherwise, the process advances to step S1709. In step S1708, the control unit 10 displays the Rewrite Prev button 606 in an invalid state. In step S1709, the control unit 10 displays the Rewrite Prev button 606 in a valid state. The control unit 10 checks in step S1710 whether or not the user inputs data to any of the fields shown in FIG. 6A or 6B as in step S1702. If it is determined that the user inputs data to any of the fields, the process advances to step S1711; otherwise, the process jumps to step S1712. In step S1711, the control unit 10 updates the additional information edit screen shown in FIG. 6B.

The control unit 10 checks in step S1712 whether or not the user has pressed the Rewrite Prev button 606. If it is determined that the user has pressed the Rewrite Prev button 606, the process advances to step S1713; otherwise, the process advances to step S1716. The control unit 10 checks in step S1713 whether or not the Rewrite Prev button 606 is displayed in the invalid state. If it is determined that the Rewrite Prev button 606 is displayed in the invalid state, the process advances to step S1714; otherwise, the process advances to step S1715.

In step S1714, the control unit 10 displays a warning message indicating that the Rewrite Prev button 606 is disabled and neither a command nor additional information data is transmitted to the digital video camera 100 even if it is pressed on the display unit 15. In step S1715, the control unit 10 updates and records the substance of additional information, which is recorded in association with a last captured clip (the latest clip of the already recorded clips), by additional information data saved in the RAM 18. On the other hand, the control unit 10 checks in step S1716 whether or not the user has pressed the Next Clip button 607. If it is determined that the user has pressed the Next Clip button 607, the process advances to step S1717; otherwise, the processing ends. In step S1717, the control unit 10 updates additional information data saved in the RAM 18.

Figure 18:
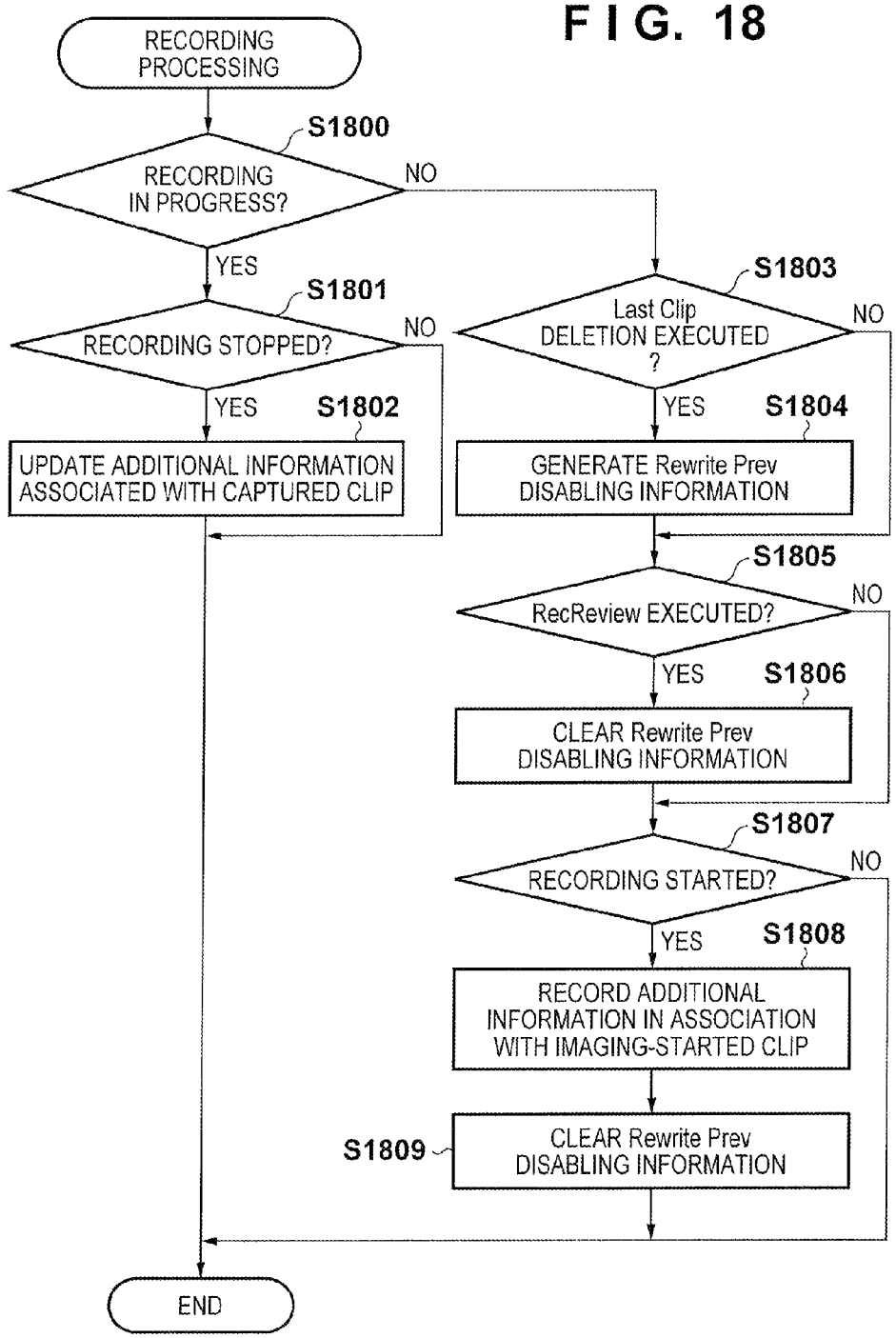
FIG. 18 is a flowchart showing the recording processing of the digital video camera 100 according to the seventh embodiment.

FIG. 18 is a flowchart showing details of the recording processing in step S1603 in FIG. 16. The control unit 10 checks in step S1800 whether or not the recording operation of the digital video camera 100 is in progress. If it is determined that the recording operation is in progress, the process advances to step S1801; otherwise, the process advances to step S1803. The control unit 10 checks in step S1801 whether or not the recording operation is stopped. If it is determined that the recording operation is stopped, the process advances to step S1802; otherwise, the processing ends. In this case, the checking processes of steps S1800 and S1801 determine whether or not a recording state shifts to a recording stopped state. In step S1802, the control unit 10 updates and records the substance of additional information, which is recorded in association with a captured clip, by additional information data saved in the RAM 18.

On the other hand, the control unit 10 checks in step S1803 whether or not a Last Clip deletion is executed. If it is determined that the Last Clip deletion is executed, the process advances to step S1804; otherwise, the process jumps to step S1805. In step S1804, the control unit 10 generates Rewrite Prev disabling information. The control unit 10 checks in step S1805 whether or not a RecReview operation is executed. If it is determined that the RecReview operation is executed, the process advances to step S1806; otherwise, the process jumps to step S1807. In step S1806, the control unit 10 clears the Rewrite Prev disabling information. The control unit 10 checks in step S1807 whether or not a recording operation is started. The checking process of step S1807 is to check whether or not the recording operation is started from the recording stopped state. If it is determined that the recording operation is started, the process advances to step S1808; otherwise, the processing ends. In step S1808, the control unit 10 records additional information data saved in the RAM 18 in association with a clip whose imaging operation is started. In step S1809, the control unit 10 clears the Rewrite Prev disabling information. After the process of step S1809, the processing ends.

As described above, according to the seventh embodiment, when the Last Clip deletion is executed in the digital video camera 100 and the substance of the last captured clip can no longer be recognized, additional information can be prevented from being recorded in association with an unintended clip. By playing back the last captured clip by the RecReview operation, the Rewrite Prev button 606 is displayed in the valid state, and the user can record additional information in association with the latest clip of the already recorded clips again.

As described above, according to the fourth to seventh embodiments, when an operation which disables to recognize the substance of the latest clip of the already recorded clips is executed on the digital video camera, additional information can be prevented from being recorded in association with an unintended clip. Furthermore, when an operation for confirming the substance of the latest clip of the already recorded clips is executed, the Rewrite Prev button 606 is displayed, in the valid state, and the user can record additional information in association with the latest clip of the already recorded clips. Note that in the fourth to seventh embodiments, the operation which disables to recognize the substance of the latest clip (operation for setting a state in which a content recorded by the immediately preceding recording operation cannot be specified) includes the Last Clip deletion, removal of a recording medium, and change of a recording destination, but the present invention is not limited to them.

Note that in the fourth to sixth embodiments, the portable terminal 200 independent of the digital video camera 100 allows the user to designate the substance of additional information for an image and an appending target image. When a system with such arrangement is used, at a movie shooting site or the like, a director, a camera operator who captures an image using the digital video camera 100, and a staff who inputs additional information using the portable terminal 200 may work on their tasks as different persons. In such case, it is difficult to link the camera operation timing of the camera operator with the appending timing of additional information by the input staff who inputs additional information, and erroneous operations readily occur. Hence, the present invention is particularly effective for such case.

The processing to be executed by the portable terminal 200 side described in the fifth and sixth embodiments can also be executed by the digital video camera 100 side as in the seventh embodiment. That is, the arrangements of the fourth to sixth embodiments are also applicable to a case in which an image management apparatus as a single apparatus executes both image recording processing and processing for inputting the substance of additional information and selecting an appending target image. That is, the control operations of the control units 10 and 21 may be implemented by one hardware component or when a plurality of hardware components share processing.

For example, in the fourth embodiment, when a Last Clip is deleted, the Rewrite Prev command is disabled. Also, the conditions (no recording destination recording medium attached, switching of a recording destination, and the like) of the fifth and sixth embodiments may be adopted as OR conditions.

Eighth Embodiment

As described in the opening sentence of the fourth embodiment, in order to enable both the first and second processes related to association of additional information with an image, every time the user inputs additional information, an operation for selecting whether an appending target of that additional information is an image to be captured or that captured by the immediately preceding imaging operation is required. Then, such an operation is a troublesome operation when the user is shooting in a hurry, and may result in an erroneous operation. In particular, when no imaging operation is performed since an operation mode transits from another mode to a camera mode (imaging mode), the latest image captured by the immediately preceding imaging operation may not be related to the current imaging operation. Therefore, the user who inputs additional information is unlikely to recognize the image captured by the immediately preceding imaging operation. When such a situation occurs, and when an operation for recording additional information in association with the image captured by the immediately preceding imaging operation is executed, the additional information may be wrongly recorded in association with an unintended image.

The eight embodiment to be described below and the ninth and 10th embodiments to be described later will explain an arrangement which can reduce a possibility of recording additional information in association with an unintended content even when the operation mode is changed, as described above.

The eighth embodiment will also exemplify a moving image management apparatus as a content management system or content management apparatus which includes a recording apparatus for recording a content including moving image data or audio data, and an operation apparatus which accepts a user operation required to append additional information to the content recorded by the recording apparatus. A digital video camera which can record a moving image will be exemplified as the recording apparatus, and a portable terminal which can communicate with the digital video camera via a wireless or wired communication will be exemplified as the operation apparatus. However, the present invention is not limited to these specific apparatuses. The recording apparatus and operation apparatus need not be independent apparatuses, and the operation apparatus may be built in the recording apparatus. In the eighth embodiment as well, the image management apparatus is configured using the digital video camera 100 (camcorder) shown in FIG. 1 and the portable terminal 200 shown in FIG. 2.

Figure 19:
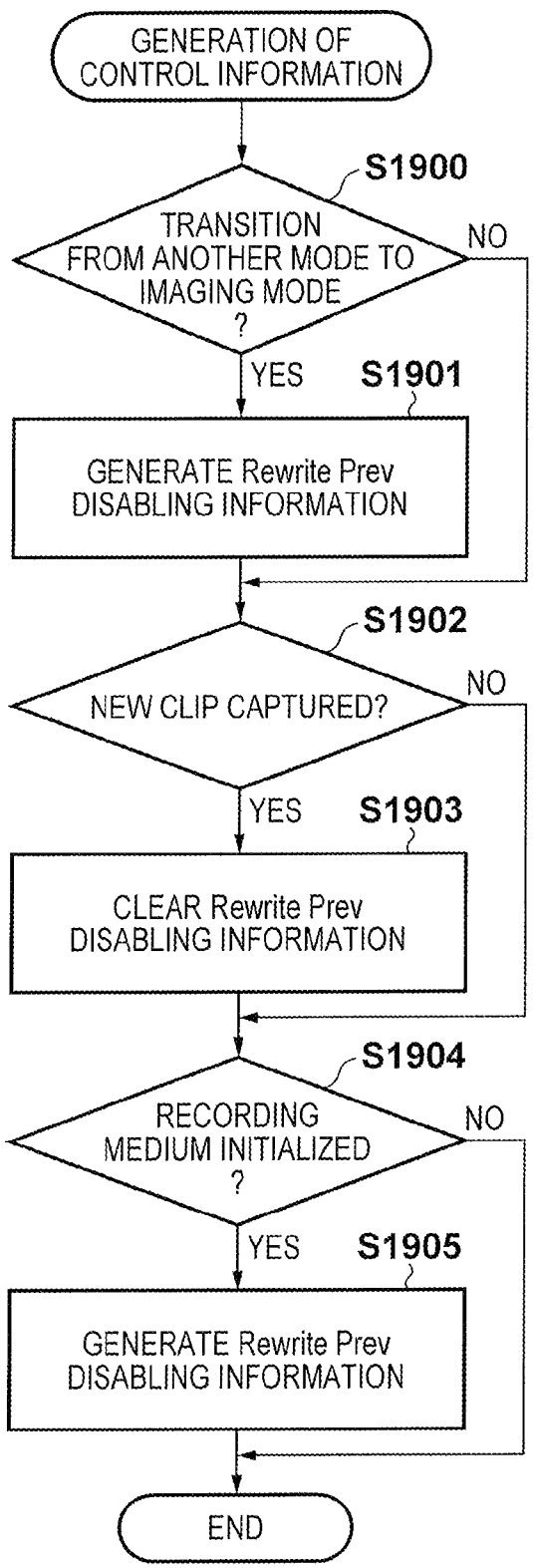
FIG. 19 is a flowchart showing the control information generation processing of the digital video camera 100 according to the eighth embodiment.

The operation of the image management apparatus according to the eighth embodiment will be described below with reference to the flowcharts shown in FIGS. 3, 19, 10A, and 10B. The operation of the digital video camera 100 will be described first with reference to FIGS. 3 and 19. Note that respective processes in the flowcharts of FIGS. 3 and 19 are implemented when the control unit 10 of the digital video camera 100 expands programs stored in the ROM 17 onto the RAM 18 and executes the expanded programs. When the digital video camera 100 is set in a camera mode (imaging mode) by a user operation for the operation unit 16, the processing shown in FIG. 3 is started. Note that the processing shown in FIG. 3 is as described in the first embodiment, and a description thereof will not be repeated.

FIG. 19 is a flowchart showing details of the control information generation processing in step S300 of FIG. 3. The control unit 10 checks in step S1900 whether or not an operation mode transits from another mode to the camera mode (imaging mode). It is determined that the digital video camera 800 transits from another mode to the camera mode (imaging mode) when the user instructs to transit from another mode such as a play mode or power-OFF state to the camera mode (imaging mode) by operating the operation unit 16. If it is determined that the operation mode transits from another mode to the camera mode (imaging mode), the process advances to step S1901; otherwise, the process jumps to step S1902. In step S1901, the control unit 10 generates "Rewrite Prev disabling information" as control information to be transmitted to the portable terminal 200 in step S301 of FIG. 3, and records that information in the RAM 18.

The control unit 10 checks in step S1902 whether or not a new clip is captured. It is determined that the new clip is captured when a recording stop instruction is issued upon reception of a recording stop command after a recording start instruction of moving image data is issued. Note that the recording start instruction of moving image data can be detected by, for example, an operation of an imaging start button included in the operation unit 16 or reception of a recording start command in step S302 of FIG. 3. Also, the recording stop instruction of moving image data can be detected by, for example, an operation of an imaging stop button included in the operation unit 16 or reception of a recording stop command in step S302 of FIG. 3. If it is determined that the new clip is captured, the process advances to step S1903; otherwise, the process jumps to step S1904. In step S1903, the control unit 10 clears the aforementioned "Rewrite Prev disabling information" in the control information to be transmitted to the portable terminal 200 in step S301 of FIG. 3.

Figure 20:
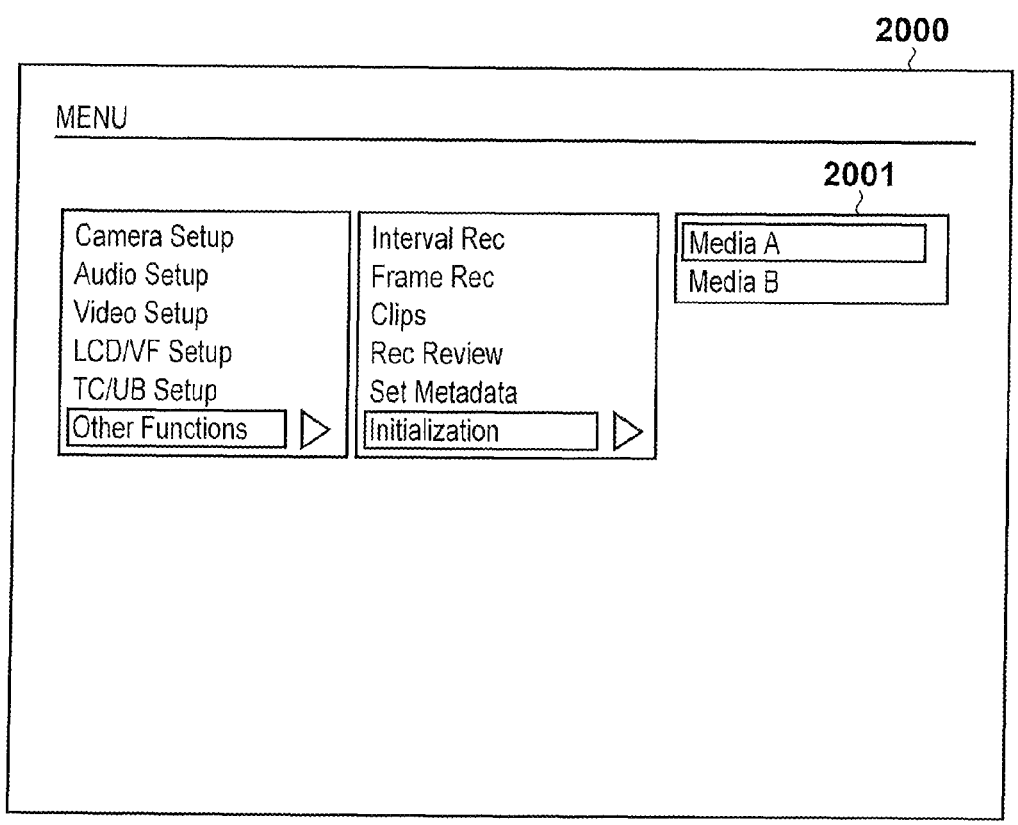
FIG. 20 is a view showing a display example of a menu screen of the digital video camera 100.

The control unit 10 checks in step S1904 whether or not the recording medium 20 is initialized. It is determined that the recording medium 20 is initialized, for example, when the user opens a menu 2000 shown in FIG. 20 by pressing a menu button included in the operation unit 16, and selects initialization of the recording medium 20 (Media A) from items of the menu 2000. If it is determined that the recording medium 20 is initialized, the process advances to step S1905; otherwise, the control information generation processing ends. In step S1905, the control unit 10 generates "Rewrite Prev disabling information" as control information to be transmitted to the portable terminal 200 in step S301 of FIG. 3 as in step S1901. After the processing of step S1905 ends, the control information generation processing ends.

The portable terminal 200 allows the user to set additional information using the additional information edit screen shown in FIG. 6A or 6B, and transmits an execution instruction including a command and additional information to the digital video camera 100 via the wireless communication unit 24. This processing is as described above using FIGS. 10A and 10B. Note that when the portable terminal 200 is set in an external device control mode by a user operation for the operation unit 23, the processing shown in FIGS. 10A and 10B is started, and the screen shown in FIG. 6A or 6B is displayed on the display unit 22.

As described above, according to the eighth embodiment, when an imaging operation is not started even once after the operation mode transits from another operation mode to the camera mode (imaging mode) in the digital video camera 100, the Rewrite Prev button 606 (FIG. 6B) is disabled on the portable terminal 200. That is, it is checked in step S1900 whether or not the operation mode of the recording apparatus which records a content on the recording medium transits from another operation mode other than the imaging mode to the imaging mode required to record the content. Then, before the first recording operation since it is determined the operation mode transits from another mode to the imaging mode is executed, a user operation required to issue a Rewrite Prev execution instruction as the first process is disabled (S1901, S1902, S1904). For this reason, additional information can be prevented from being recorded in association with an unintended clip. Also, according to this embodiment, when the recording medium 20 is initialized, the Rewrite Prev button 606 on the portable terminal 200 is disabled. For this reason, although the recording medium 20 does not store any clip, the user can be prevented from misunderstanding that he or she records additional information in association with the last captured clip.

Ninth Embodiment

An image management apparatus according to the ninth embodiment will be described below. The image management apparatus according to the ninth embodiment is configured using, for example, the digital video camera 800 (camcorder) shown in FIG. 12 and the portable terminal 200 shown in FIG. 2. The portable terminal 200 can be implemented by the same arrangement as in the first embodiment.

Figure 21:
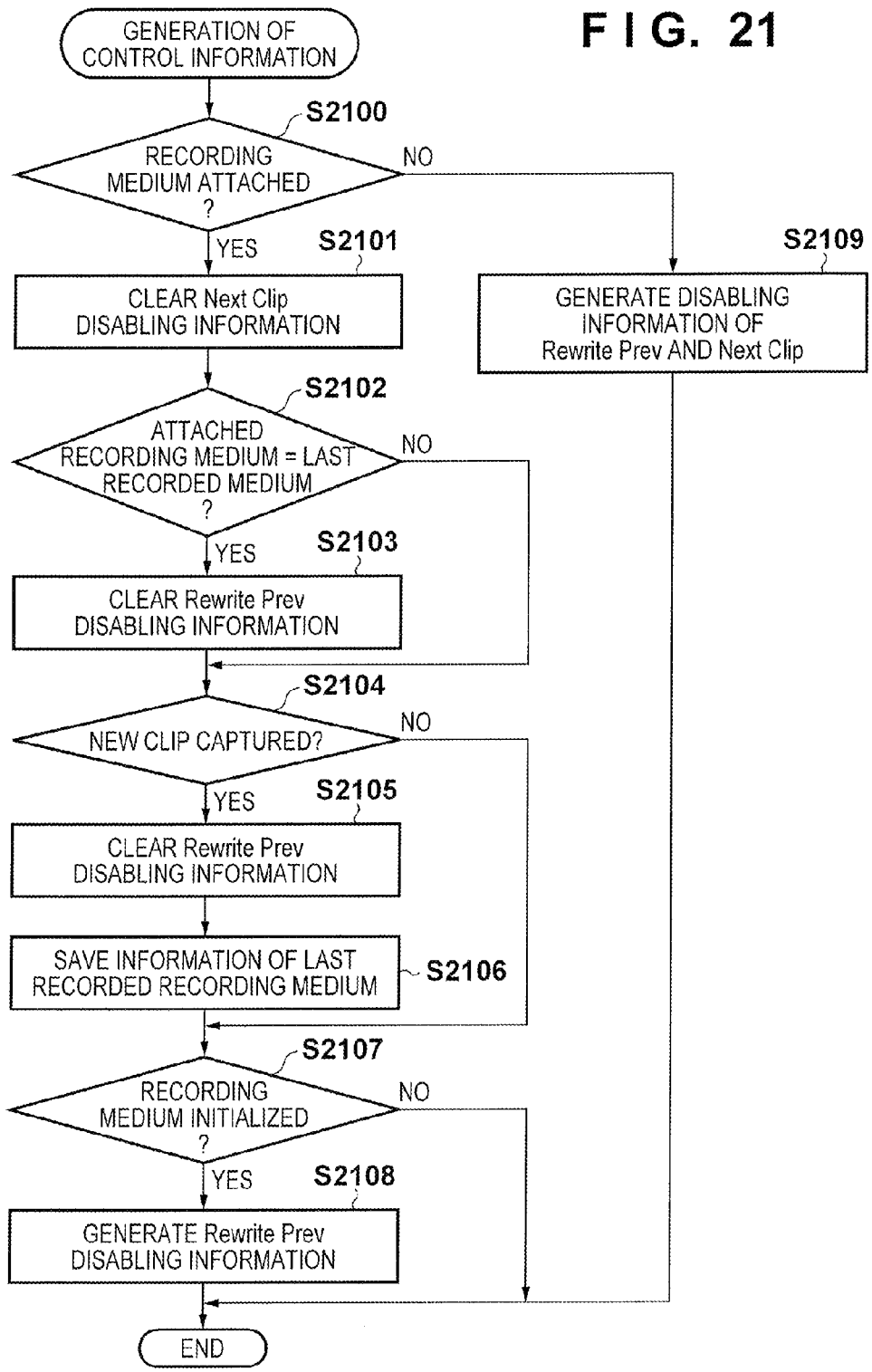
FIG. 21 is a flowchart showing the control information generation processing of the digital video camera 800 according to the ninth embodiment.

The moving image management apparatus according to the ninth embodiment executes processes shown in the flowcharts of FIGS. 3, 10A, 10B, and 21. Respective processes shown in the flowcharts of FIGS. 3 and 21 are implemented when the control unit 10 of the digital video camera 800 expands programs stored in the ROM 17 onto the RAM 18 and executes the expanded programs. When the digital video camera 800 is set in a camera mode (imaging mode) by a user operation for the operation unit 16, the processing shown in FIG. 3 is started. Since the overall processing sequence (FIG. 3) in the camera mode of the digital video camera 800 is the same as that in the eighth embodiment, a description thereof will not be repeated.

FIG. 21 is a flowchart showing details of the control information generation processing in step S300 of FIG. 3. The control unit 10 checks in step S2100 whether or not the recording medium 20 is attached to the recording medium I/F 19. Whether or not the recording medium 20 is attached is checked via the recording medium detection unit 40. If it is determined that the recording medium 20 is attached, the process advances to step S2101; otherwise, the process advances to step S2109. In step S2101, the control unit 10 clears disabling information of the Next Clip button 706 as control information to be transmitted to the portable terminal 200 in step S301 of FIG. 3.

The control unit 10 checks in step S2102 whether or not the recording medium attached to the recording medium I/F 19 is that which recorded a moving image lastly. As an example of a method of determining a recording medium which recorded a moving image lastly, the following method may be used. That is, information of a recording medium which recorded a moving image lastly is saved in the RAM 18, and when the recording medium information saved in the RAM 18 matches information of a recording destination recording medium, it is determined that the recording medium attached to the recording medium I/F 19 is that which recorded a moving image lastly. If it is determined in step S2102 that the recording medium attached to the recording medium I/F 19 is that which recorded a moving image lastly, the process advances to step S2103; otherwise, the process jumps to step S2104. In step S2103, the control unit 10 clears the Rewrite Prev disabling information.

The control unit 10 checks in step S2104 whether or not a new clip is captured. If it is determined that the new clip is captured, the process advances to step S2105; otherwise, the process jumps to step S2107. In step S2105, the control unit 10 clears the Rewrite Prev disabling information. In step S2106, the control unit 10 saves information of the last recorded recording medium in the RAM 18. The control unit 10 checks in step S2107 whether or not the recording medium 20 is initialized. If it is determined that the recording medium 20 is initialized, the process advances to step S2108; otherwise, the processing ends. In step S2108, the control unit 10 generates Rewrite Prev disabling information. On the other hand, in step S2109, the control unit 10 generates disabling information of the Rewrite Prev and Next Clip buttons as control information to be transmitted to the portable terminal 200 in step S301 of FIG. 3.

As in the eighth embodiment, respective processes shown in FIGS. 10A and 10B are implemented when the control unit 21 included in the portable terminal 200 expands programs stored in the ROM 25 onto the RAM 26 and executes the expanded programs. When the portable terminal 200 is set in an external device control mode by a user operation for the operation unit 23, the processing shown in FIGS. 10A and 10B is started. The processing sequence of the portable terminal 200 is the same as that in the eighth embodiment.

Note that the ninth embodiment executes control according to the attaching state of the recording medium 20, but the present invention is not limited to this. For example, when the recording medium OF 19 has a lid, and an open/close state of the lid can be detected, the same control can be executed based on the open/close state of the lid. In this case, it is checked in step S2100 whether or not the lid is open. If the lid is open, the process advances to step S2109; otherwise, the process advances to step S2101.

As described above, according to the ninth embodiment, when the recording medium 20 is exchanged in the digital video camera 800, and the substance of the last captured clip can no longer be recognized, the Rewrite Prev and Next Clip buttons are disabled. For this reason, the user can be prevented from recording additional information in association with an unintended clip from the portable terminal 200. Also, when the recording medium 20 is initialized, the Rewrite Prev command is disabled, and the Rewrite Prev button 606 on the portable terminal 200 is displayed in the invalid state. For this reason, although the recording medium does not store any clip, the user can be prevented from misunderstanding that he or she records additional information in association with the last captured clip.

10th Embodiment

A moving image management apparatus according to the 10th embodiment will be described below. FIGS. 14 and 2 show an example of the arrangement of an image management apparatus according to the 10th embodiment. The image management apparatus can be configured using the digital video camera 1000 (camcorder) shown in FIG. 14 and the portable terminal 200 shown in FIG. 2.

The digital video camera 1000 of the 10th embodiment has two interfaces, that is, the recording medium I/F 19 and recording medium I/F 50, and can attach two recording media required to record image data. The recording medium I/F 19 and recording medium I/F 50 are slots into which detachable recording media such as memory cards can be inserted. FIG. 14 illustrates an example in which the recording media 20 and 51 are respectively attached to the recording medium I/F 19 and recording medium I/F 50. The following description will be given using the arrangement in which image data are recorded on the two detachable recording media. However, the present invention is not limited to this. For example, an arrangement using two or more memories which are not detachable and are incorporated in the digital video camera 1000 or that using a combination of the detachable recording medium 20 and a non-detachable internal memory may be used. Other units are the same as those in the eighth embodiment (FIG. 1). Also, the portable terminal 200 is the same as that in the first embodiment.

Figure 22:
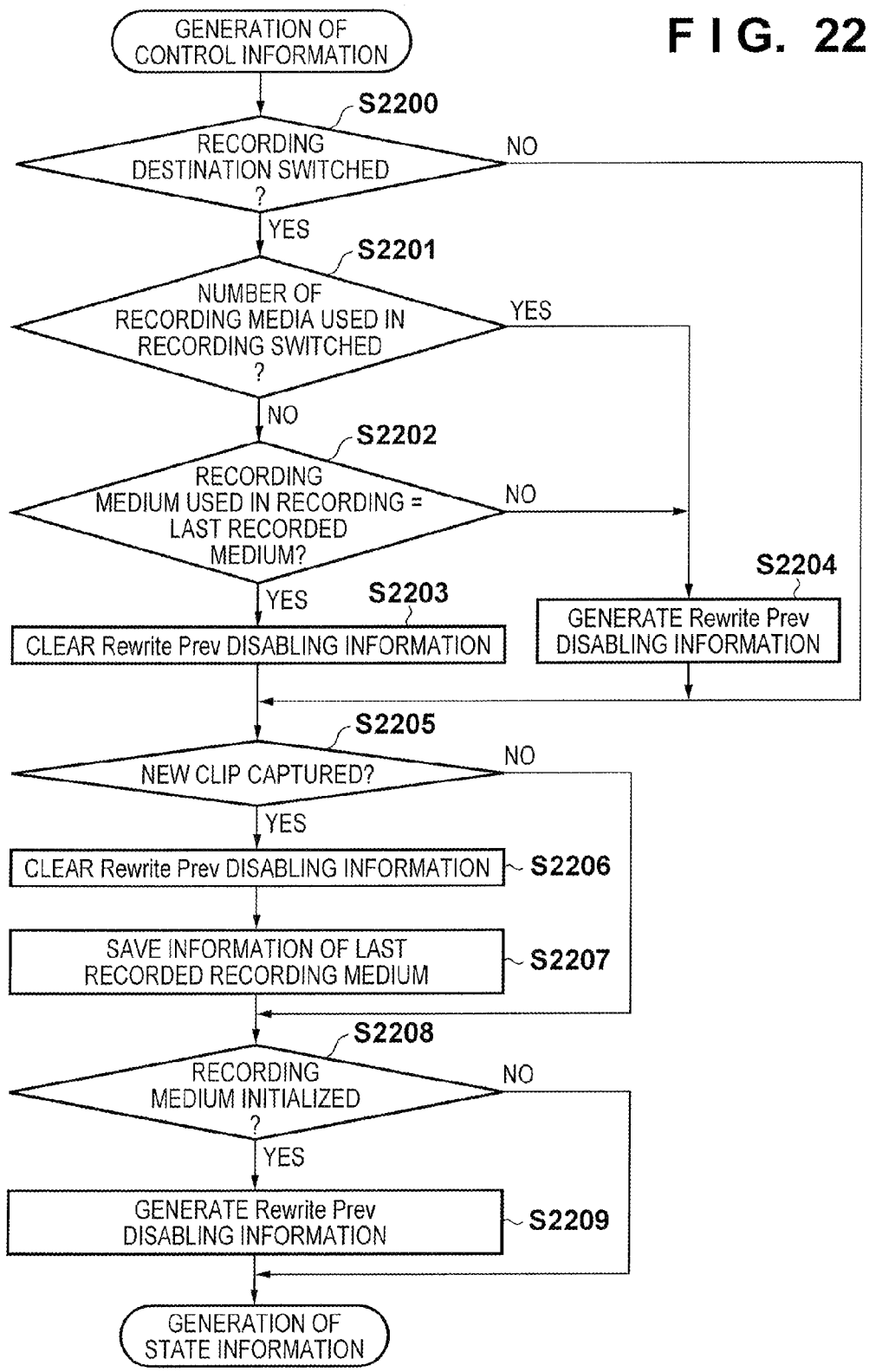
FIG. 22 is a flowchart showing the control information generation processing of the digital video camera 1000 according to the 10th embodiment.

The moving image management apparatus of the 10th embodiment executes processing shown in the flowcharts of FIGS. 3, 10A, 10B, and 22. Respective processes shown in the flowcharts of FIGS. 3 and 22 are implemented when the control unit 10 of the digital video camera 1000 expands programs stored in the ROM 17 onto the RAM 18 and executes the expanded programs. When the digital video camera 1000 is set in a camera mode (imaging mode) by a user operation for the operation unit 16, the processing shown in FIG. 3 is started. In this embodiment, a double REC function is available. In the double REC function, an identical image is parallelly recorded on plurality of recording media. With this mode, a backup file is automatically generated. Note that the overall processing sequence in the camera mode of the digital video camera 1000 is the same as that in the eighth embodiment (FIG. 3).

FIG. 22 is a flowchart showing details of the control information generation processing in step S300 of FIG. 3. The control unit 10 checks in step S2200 whether or not a recording destination recording medium of a captured image is switched. It is determined that the recording destination recording medium is switched, for example, when the user presses a recording medium switching button included in the operation unit 16. If it is determined that the recording destination recording medium is switched, the process advances to step S2201; otherwise, the process jumps to step S2205. The control unit 10 checks in step S2201 whether or not the number of recording media used as recording targets is switched. This switching corresponds to ON/OFF of the double REC function. When the number of recording media used as recording targets is 1, the double REC function is OFF. When the number of recording media used as recording targets is two or more, the double REC function is ON, and an identical image is parallelly recorded on the two or more set recording media. If it is determined in step S2201 that the number of recording media used as recording targets is switched, the process advances to step S2204; otherwise, the process advances to step S2202.

The control unit 10 checks in step S2202 whether or not the recording medium used in recording is that which recorded a moving image lastly. If it is determined in step S2202 that the recording medium used in recording is that which recorded a moving image lastly, the process advances to step S2203; otherwise, the process advances to step S2204. In step S2203, the control unit 10 clears Rewrite Prev disabling information in control information to be transmitted to the portable terminal 200 in step S301 of FIG. 3. On the other hand, in step S2204, the control unit 10 generates Rewrite Prev disabling information as control information to be transmitted to the portable terminal 200 in step S301 of FIG. 3. Note that steps S2205 to S2209 in FIG. 22 are the same processes as in steps S2104 to S2108 in FIG. 21 described in the ninth embodiment.

Respective processes shown in FIGS. 10A and 10B are implemented when the control unit 21 included in the portable terminal 200 expands programs stored in the ROM 25 onto the RAM 26 and executes the expanded programs. When the portable terminal 200 is set in an external device control mode by a user operation for the operation unit 23, the processing shown in FIGS. 10A and 10B is started. The overall processing sequence in the portable terminal 200 is the same as that in the eighth embodiment.

Note that in the 10th embodiment, switching of the recording destination recording medium is controlled based on pressing of the recording medium switching button included in the operation unit 16. The present invention is not limited to this, and the recording destination may be switched in response to other operations. For example, the recording destination may be switched:

when a recording destination recording medium is selected from a menu;

when an arrangement for detecting whether or not the recording medium is attached is available and when removal of the recording medium set as a recording destination recording medium is detected; or when the recording medium I/F 19 has a lid and an arrangement for detecting an open/close state of the lid is available and when the open state of the recording medium I/F 19 set as a recording destination recording medium is detected.

In the above description, the number of recording media is two. However, the same control is applicable to three or more recording media.

As described above, according to the 10th embodiment, when the recording destination recording medium is switched or the number of recording destination recording media is switched in the digital video camera 1000 and the substance of the last captured clip can no longer be recognized, the Rewrite Prev command is disabled. For this reason, the user can be prevented from recording additional information in association with an unintended clip from the portable terminal 200. When the recording medium 20 set as a recording destination is initialized, the Rewrite Prev command is disabled, and the Rewrite Prev button 606 on the portable terminal 200 is displayed in the invalid state. For this reason, although no clip is stored, the user can be prevented from misunderstanding that he or she records additional information in association with the last captured clip.

11th Embodiment

In the aforementioned eighth to 10th embodiments, the portable terminal 200 different from the digital video camera is used to input the substance of additional information and to select an appending target image. Alternatively, the digital video camera itself can execute such operations (the same as in the seventh embodiment). The 11th embodiment will explain an example in which the same processing as that executed by the portable terminal 200 in the eighth embodiment is executed in the digital video camera 100. Note that the arrangement of the digital video camera 100 of the 11th embodiment can be implemented by the same arrangement as that in the eighth embodiment (FIG. 1).

FIGS. 16, 17A, 17B, and 23 are flowcharts of the 11th embodiment. Respective processes shown in the flowcharts of FIGS. 16, 17A, 17B, and 23 are implemented when the control unit 10 of the digital video camera 100 expands programs stored in the ROM 17 onto the RAM 18 and executes the expanded programs. When the digital video camera 100 is set in a camera mode (imaging mode) by a user operation for the operation unit 16, the processing shown in FIG. 16 is started. The processing substance of FIG. 16 is as described in the seventh embodiment. Also, the additional information edit processing executed in step S1601 is as described in the seventh embodiment with reference to FIGS. 17A and 17B. The recording processing in step S1603 of FIG. 16 will be described below with reference to the flowchart shown in FIG. 23.

Figure 23:
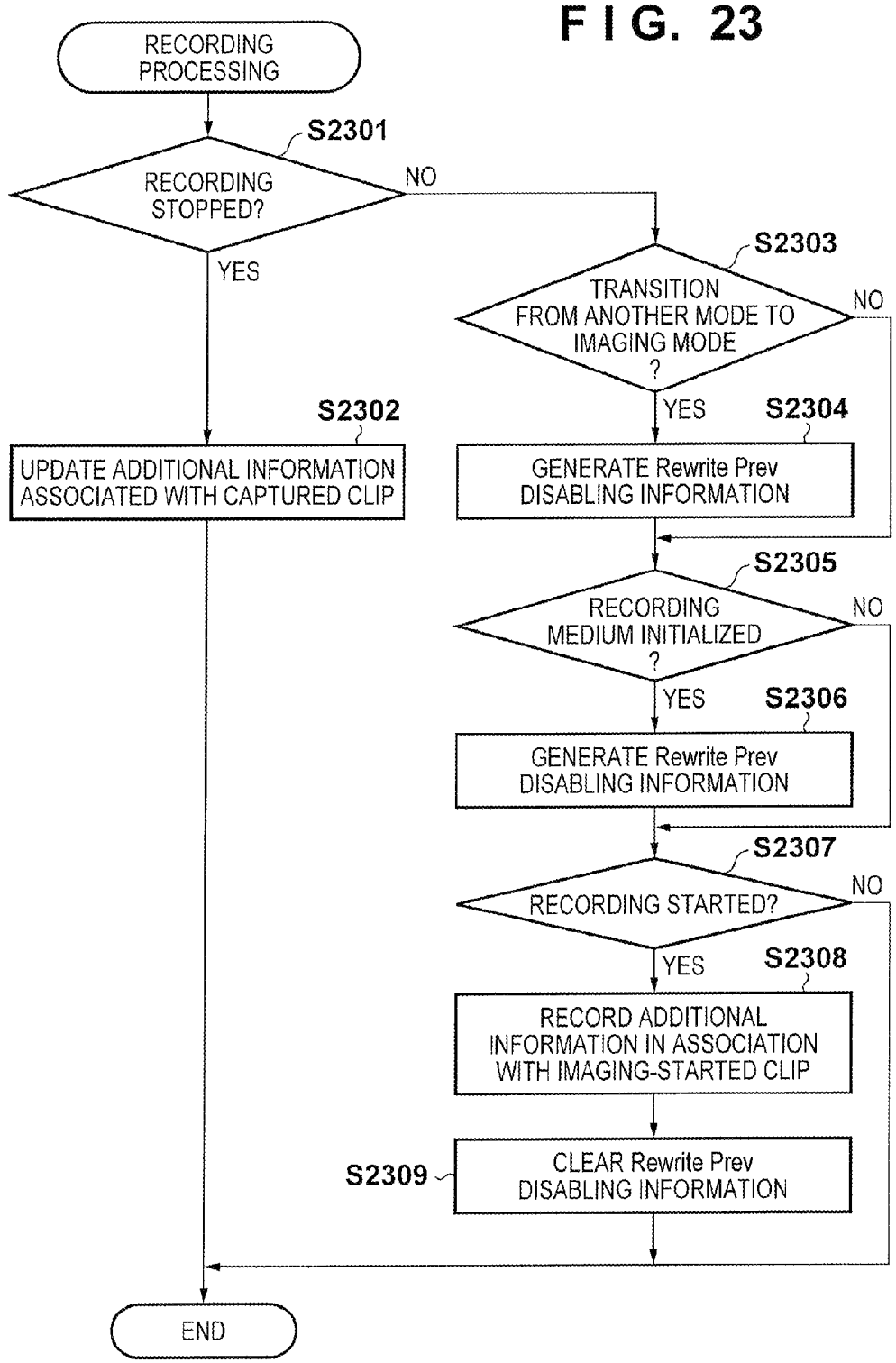
FIG. 23 is a flowchart showing the recording processing of the digital video camera 100 according to the 11th embodiment.

FIG. 23 is a flowchart showing details of the recording processing in step S1603 of FIG. 16. The control unit 10 checks in step S2301 whether or not a recording stop instruction of a recording operation in the digital video camera 100 is issued. If it is determined that the recording operation is stopped, the process advances to step S2302; otherwise, the process advances to step S2303. In step S2302, the control unit 10 updates the substance of additional information, which is recorded in association with a captured clip, by additional information saved in a holding area of the RAM 18.

On the other hand, the control unit 10 checks in step S2303 whether or not a mode transmits from another mode to the camera mode (imaging mode). If it is determined that the mode transits from another mode to the camera mode (imaging mode), the process advances to step S2304; otherwise, the process jumps to step S2305. In step S2304, the control unit 10 generates Rewrite Prev disabling information. The control unit 10 checks in step S2305 whether or not the recording medium 20 is initialized. If it is determined that the recording medium 20 is initialized, the process advances to step S2306; otherwise, the process jumps to step S2307. In step S2306, the control unit 10 generates Rewrite Prev disabling information as in step S2304. The control unit 10 checks in step S2307 whether or not a recording operation is started. The checking processing of step S2307 checks whether or not the recording operation is started from a recording stopped state. If it is determined that the recording operation is started, the process advances to step S2308; otherwise, the processing ends. In step S2308, the control unit 10 records additional information saved in the holding area of the RAM 18 in association with a clip whose imaging operation is started. In step S2309, the control unit 10 clears Rewrite Prev disabling information. After step S2309 ends, the processing ends.

As described above, according to the 11th embodiment, when the operation mode transits from another mode to the camera mode (imaging mode) in the digital video camera 100 and the substance of the last captured clip can no longer be recognized, the Rewrite Prev operation is disabled. For this reason, the user can be prevented from recording additional information in association with an unintended clip. When the recording medium 20 is initialized, the Rewrite Prev operation is disabled, and a Rewrite Prev button 606 is displayed in an invalid state. For this reason, although no clip is stored, the user can be prevented from misunderstanding that he or she records additional information in association with the last captured clip.

Note that the processing to be executed by the portable terminal 200 side described in the ninth and 10th embodiments can also be executed by the digital video camera 100 side as in this embodiment. That is, the eighth to 10th embodiments are also applicable to a case in which an image management apparatus as a single apparatus executes both image recording processing and processing for inputting the substance of additional information and selecting an appending target image. That is, the control operations of the control units 10 and 21 may be implemented by one hardware component or when a plurality of hardware components share processing.

Note that in the eighth to 10th embodiments, the portable terminal 200 independent of the digital video camera 100 allows the user to designate the substance of additional information for an image, and a target image to which that information is to be appended. When a system with such arrangement is used, at a movie shooting site or the like, a director, a camera operator who captures an image using the digital video camera 100, and a staff who inputs additional information using the portable terminal 200 may work on their tasks as different persons. In such case, it is difficult to link the camera operation timing of the camera operator with the appending timing of additional information by the input staff who inputs additional information, and erroneous operations readily occur. Hence, the present invention is particularly effective for such case.

The present invention has been described based on its preferred embodiments. However, the present invention is not limited to these specific embodiments, and various aspects without departing from the scope of the invention are also included in the present invention. Furthermore, the aforementioned eighth to 11th embodiments are merely embodiments of the present invention, and the respective embodiments can be combined as needed. For example, in the eighth embodiment, when the operation mode transits from another mode to the imaging mode, the Rewrite Prev command is disabled. This condition may be adopted as an AND condition in the ninth and 10th embodiments.

The present invention has been described based on its preferred embodiments. However, the present invention is not limited to these specific embodiments, and various aspects without departing from the scope of the invention are also included in the present invention. Furthermore, the aforementioned embodiments are merely embodiments of the present invention, and the respective embodiments can be combined as needed.

As an association method of additional information, the case has been exemplified wherein additional information is associated with a moving image by storing the additional information as an additional information file independent of a moving image file in the same folder as the moving image file. However, the present invention is not limited to this. For example, the association method of additional information may include a method of associating additional information with a moving image by recording the additional information as a metadata file independent of a moving image file, and associating the moving image file with the metadata file, a method of directly recording additional information in a header part in an image file, and the like. Also, association may be attained by inputting an identical character string in a list or file names.

In the above embodiments, the Rewrite Prev button 606 is implemented using the touch panel. Alternatively, the Rewrite Prev button 606 may be implemented using a mechanical switch. In this case, a lamp is provided to the switch, and whether or not the Rewrite Prev button 606 is enabled may be presented to the user based on whether or not that lamp is ON.

Furthermore, in the above embodiments, the case has been exemplified wherein additional information is appended to a moving image as a content. However, the present invention is applicable to a case in which additional information is appended to a still image. Furthermore, the case has been exemplified wherein additional information is appended to an image captured by the imaging unit 12. However, an image to which additional information is to be appended is not limited to that captured by the imaging unit 12, and the present invention may be applied to a case in which an externally input moving image is recorded or a still image is recorded. That is, in the above embodiments, the case has been exemplified wherein the present invention is applied to the digital video camera. However, the present invention is not limited to these examples. That is, the present invention is applicable to a content management apparatus which records a content such as image data or audio data, and can associate additional information with the recorded content. Therefore, the present invention is applicable to a personal computer, PDA, mobile phone, portable image viewer, printer including a display, digital photo frame, music player, game machine, e-book reader, television, DVD recorder, and the like.

As described above, according to the present invention, in an operation required to record additional information upon recording a content including image or audio data, the additional information can be correctly associated with a content intended by the user.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, non-transitory computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-237963, filed Oct. 28, 2011, 2011-237964, filed Oct. 28, 2011 and 2011-237965, filed Oct. 28, 2011, which are hereby incorporated by reference herein in their entirety.

What is claimed is:

1. A content management apparatus including a recording unit configured to record a content, and an operation unit configured to accept a user operation required to append additional information to the content, said apparatus comprising:
   an execution unit configured to execute a first process for recording additional information in association with latest content data recorded in a recording medium in the recording unit in response to a predetermined user operation; and
   a control unit configured to enable, when the latest content data recorded in the recording medium is determined to have been recorded in the recording medium by an immediately preceding recording operation of the recording unit, the predetermined user operation required to issue an execution instruction of the first process,
   wherein the control unit disables, when the latest content data recorded in the recording medium become content data that have not been recorded in the recording medium by an immediately preceding recording operation of the recording unit due to deletion of content data that have been recorded in the recording medium by an immediately preceding recording operation, the predetermined user operation required to issue the execution instruction of the first process.

2. The apparatus according to claim 1, further comprising a determination unit configured to determine whether or not the latest content data is in a specifiable state as the content data recorded by the immediately preceding recording operation by the recording unit.

3. The apparatus according to claim 2, wherein said determination unit determines that the latest content data is not in the specifiable state when a command to delete latest content data recorded in the recording medium is executed.

4. The apparatus according to claim 1, wherein when new content data is recorded in the recording medium or when an access to latest content data of content data recorded in the recording medium occurs, the control unit enables the user operation required to issue the execution instruction.

5. The apparatus according to claim 1, further comprising:
   a connection unit configured to connect an external terminal apparatus which provides the execution instruction to be able to communicate with each other,
   wherein when the determination unit determines that the latest content data is not in the specifiable state, the control unit transmits information indicating that the user operation required to issue the execution instruction is disabled to the terminal apparatus via the connection unit.

6. A recording apparatus, which is configured to communicate with an operation apparatus, comprising:
   an execution unit configured to execute a first process for recording additional information in association with latest content data recorded in a recording medium in response to an execution instruction from the operation apparatus;
   a recording unit configured to record content data in the recording medium; and
   a notification unit configured to notify the operation apparatus of information as to whether or not latest content data recorded in the recording medium is in a specifiable state as content data recorded by an immediately preceding recording operation in the recording medium,
   wherein the notification unit notifies, when content data recorded by an immediately preceding recording operation in the recording medium have been deleted, that latest content data recorded in the recording medium is not in the specifiable state as content data recorded by an immediately preceding recording operation in the recording medium.

7. An operation apparatus, which is configured to communicate with a recording apparatus for recording content data in a recording medium, comprising:
   a control unit configured to control to display a display item required to accept a user operation required to issue an execution instruction of a first process for recording additional information in association with latest content data recorded in a recording medium; and
   a reception unit configured to receive a notification as to whether or not the latest content data recorded in the recording medium is in a specifiable state as content data that the recording apparatus has recorded by an immediately preceding recording operation in the recording medium,
   wherein the reception unit receives, when content data recorded by an immediately preceding recording operation in the recording medium have been deleted, a notification indicating that the latest content data recorded in the recording medium is not in the specifiable state as content data recorded by an immediately preceding recording operation in the recording medium, and
   the control unit controls not to accept the user operation required to issue the execution instruction of the first process by changing a display mode of the display item when receiving the notification indicating that the latest content data is not in the specifiable state.

* * * * *